(12) United States Patent
Hojo et al.

(10) Patent No.: US 8,106,634 B2
(45) Date of Patent: Jan. 31, 2012

(54) SWITCHING POWER SUPPLY AND PORTABLE DEVICE

(75) Inventors: Yoshiyuki Hojo, Kyoto (JP); Hirotaka Nakabayashi, Kyoto (JP)

(73) Assignee: Rohm Co., Ltd., Kyoto-shi, Kyoto-fu (JP)

( * ) Notice: Subject to any disclaimer, the term of this patent is extended or adjusted under 35 U.S.C. 154(b) by 428 days.

(21) Appl. No.: 12/469,965

(22) Filed: May 21, 2009

(65) Prior Publication Data

US 2009/0289612 A1 Nov. 26, 2009

(30) Foreign Application Priority Data

May 23, 2008 (JP) .................................. 2008-135964

(51) Int. Cl.
*G05F 1/00* (2006.01)
(52) U.S. Cl. ........................................................ 323/222
(58) Field of Classification Search .......... 323/222–225, 323/282–285
See application file for complete search history.

(56) References Cited

U.S. PATENT DOCUMENTS

| 6,362,608 | B1 * | 3/2002 | Ashburn et al. | 323/272 |
|---|---|---|---|---|
| 7,061,218 | B2 * | 6/2006 | Ito | 323/351 |
| 7,321,222 | B2 | 1/2008 | Hojo | |
| 7,342,391 | B2 * | 3/2008 | Tateno et al. | 323/316 |
| 2006/0091870 | A1 * | 5/2006 | Yoshida et al. | 323/282 |

FOREIGN PATENT DOCUMENTS

JP 06-303766 10/1994
WO WO 2005/078910 8/2005

* cited by examiner

*Primary Examiner* — Adolf Berhane
*Assistant Examiner* — Yemane Mehari
(74) *Attorney, Agent, or Firm* — Fish & Richardson P.C.

(57) ABSTRACT

A switching power supply includes a switching element connected to a power supply voltage and performs ON and OFF operation; a control circuit; a coil; a capacitor connected to the coil and performs a rectifying operation with the coil; an oscillator to output an oscillator signal to the control circuit; a first comparator for comparing a current detection voltage which transforms a detection current flowing through the coil into a voltage, and the feedback voltage according to a difference of a voltage according to an output voltage with a reference voltage; and a second comparator for comparing a deep threshold voltage set as a value higher than the current detection voltage and is lower than the power supply voltage, with the feedback voltage. A Deep Simple Light Load Mode control is introduced to improve efficiency in a light or no-load area in addition to PWM mode in a heavy loading.

24 Claims, 29 Drawing Sheets

FIG. 11

| ITEM | |
|---|---|
| INPUT VOLTAGE | 2.3~4.5V |
| OUTPUT VOLTAGE | 1.2V/1.8V |
| OUTPUT CURRENT | 300mA Max/300mA Max |
| UVLO DETECTION VOLTAGE | 2.1V Typ |
| SHORT PROTECTION (TIMER LATCH MODE) | VALID |
| SOFT START FUNCTION | VALID |
| STANDBY CURRENT | 0μA |
| OPERATIONAL TEMPERATURE RANGE | -30~85°C |
| PACKAGE | VSCP50L2 |

FIG. 12

| ITEM | SYMBOL | RATING | UNIT |
|---|---|---|---|
| POWER SUPPLY VOLTAGE | Vcc | -0.3~+7 | V |
| EN VOLTAGE | VEN1 | -0.3~+7 | V |
| | VEN2 | -0.3~+7 | V |
| SW VOLTAGE | VSW1 | -0.3~+7 | V |
| | VSW2 | -0.3~+7 | V |
| SW TERMINAL OUTPUT CURRENT | ISW1 | 450 | mA |
| | ISW2 | 450 | mA |
| MAXIMUM POWER DISSIPATION | PD | 660 | mW |
| OPERATIONAL TEMPERATURE RANGE | Topr | -30~+85 | °C |
| STORAGE TEMPERATURE RANGE | Tstg | -55~+150 | °C |
| JUNCTION TEMPERATURE | Tjmax | +150 | °C |

FIG. 13

| ITEM | SYMBOL | MINIMUM | TYPICAL | MAXIMUM | UNIT |
|---|---|---|---|---|---|
| POWER SUPPLY VOLTAGE | Vcc | 2.3 | 3.3 | 4.5 | V |
| EN VOLTAGE | VEN1 | 0 | - | 4.5 | V |
|  | VEN2 | 0 | - | 4.5 | V |
| SW TERMINAL AVERAGE OUTPUT CURRENT | ISW1 | - | - | 300 | mA |
|  | ISW2 | - | - | 300 | mA |

FIG. 14

| ITEM | SYMBOL | STANDARD VALUE | | | UNIT | CONDITION |
|---|---|---|---|---|---|---|
|  |  | MINIMUM | TYPICAL | MAXIMUM |  |  |
| STANDBY CIRCUIT CURRENT | ISTB | - | 0 | 10 | $\mu A$ | VEN1=VEN2=0V |
| ACTIVE CIRCUIT CURRENT | Icc | - | 50 | 80 | $\mu A$ |  |
| EN Low VOLTAGE | VENL | - | GND | 0.3 | V | STANDBY MODE |
| EN High VOLTAGE | VENH | 0.95 | Vcc | - | V | ACTIVE MODE |
| EN FLOW-IN CURRENT | IEN | - | 1 | 10 | $\mu A$ | VEN1=VEN2=2V |
| OPERATIONAL FREQUENCY | Fosc | 1.6 | 2 | 2.4 | MHz |  |
| Pch FET ON RESISTOR | Ronp1 | - | 0.6 | 1.2 | $\Omega$ | Vcc=3.3V |
|  | Ronp2 | - | 0.6 | 1.2 | $\Omega$ | Vcc=3.3V |
| Nch FET ON RESISTOR | Ronn1 | - | 0.5 | 1.0 | $\Omega$ | Vcc=3.3V |
|  | Ronn2 | - | 0.5 | 1.0 | $\Omega$ | Vcc=3.3V |
| OUTPUT VOLTAGE | VOUT1 | 1.182 | 1.2 | 1.218 | V | ±1.5% |
|  | VOUT2 | 1.773 | 1.8 | 1.827 | V | ±1.5% |
| UVLO DETECTION VOLTAGE | VUVLO1 | 2.0 | 2.1 | 2.2 | V | Vcc=3.3→0V |
| UVLO RELEASE VOLTAGE | VUVLO2 | 2.02 | 2.15 | 2.3 | V | Vcc=0V→3.3V |
| SOFT START TIME | Tss | 0.1 | 0.2 | 0.4 | ms |  |
| TIMER LATCH TIME | TLATCH | 0.25 | 0.5 | 1 | ms | SCP/TSD OPERATIONAL MODE |
| OUTPUT SHORT DETECTION VOLTAGE | Vscp1 | - | 0.6 | 0.84 | V | VOUT1=1.2→0V |
|  | Vscp2 | - | 0.9 | 1.26 | V | VOUT2=1.8→0V |

FIG. 15

| ITEM | SYMBOL | STANDARD VALUE | | | UNIT | CONDITION |
|---|---|---|---|---|---|---|
| | | MINIMUM | TYPICAL | MAXIMUM | | |
| STANDBY CIRCUIT CURRENT | ISTB | - | 0 | 10 | µA | VEN1=VEN2=0V |
| ACTIVE CIRCUIT CURRENT | Icc | - | 50 | 80 | µA | |
| EN Low VOLTAGE | VENL | - | GND | 0.3 | V | STANDBY MODE |
| EN High VOLTAGE | VENH | 0.95 | Vcc | - | V | ACTIVE MODE |
| EN FLOW-IN CURRENT | IEN | - | 1 | 10 | µA | VEN1=VEN2=2V |
| OPERATIONAL FREQUENCY | Fosc | 1.6 | 2 | 2.4 | MHz | |
| Pch FET ON RESISTOR | Ronp1 | - | 0.6 | 1.2 | Ω | Vcc=3.3V |
| | Ronp2 | - | 0.6 | 1.2 | Ω | Vcc=3.3V |
| Nch FET ON RESISTOR | Ronn1 | - | 0.5 | 1.0 | Ω | Vcc=3.3V |
| | Ronn2 | - | 0.5 | 1.0 | Ω | Vcc=3.3V |
| OUTPUT VOLTAGE | VOUT1 | 1.182 | 1.2 | 1.218 | V | ±1.5% |
| | VOUT2 | 1.822 | 1.85 | 1.878 | V | ±1.5% |
| UVLO DETECTION VOLTAGE | VUVLO1 | 2.0 | 2.1 | 2.2 | V | Vcc=3.3→0V |
| UVLO RELEASE VOLTAGE | VUVLO2 | 2.02 | 2.15 | 2.3 | V | Vcc=0→3.3V |
| SOFT START TIME | Tss | 0.1 | 0.2 | 0.4 | ms | |
| TIME RLATCH TIME | TLATCH | 0.25 | 0.5 | 1 | ms | SCP/TSD OPERATIONAL MODE |
| OUTPUT SHORT DETECTION VOLTAGE | Vscp1 | - | 0.6 | 0.84 | V | VOUT1=1.2→0V |
| | Vscp2 | - | 0.925 | 1.295 | V | VOUT2=1.8→0V |

FIG. 16

| Pin No. | Pin NAME | PIN FUNCTION |
|---|---|---|
| A1 | GND | GND TERMINAL/nMOSFET SOURCE TERMINAL |
| A2 | SW2 | Ch2pMOS/nMOSFET DRAIN OUTPUT TERMINAL |
| A3 | EN2 | Ch2 ENABLE TERMINAL(High ACTIVE) |
| A4 | VOUT2 | Ch2 OUTPUT VOLTAGE TERMINAL |
| B1 | SW1 | Ch1pMOS/nMOSFET DRAIN OUTPUT TERMINAL |
| B2 | Vcc | Vcc SUPPLY INPUT TERMINAL/pMOSFET SOURCE TERMINAL |
| B3 | EN1 | Ch1 ENABLE TERMINAL(High ACTIVE) |
| B4 | VOUT1 | Ch1 OUTPUT VOLTAGE TERMINAL |

| NUMBER | ELEMENT | VALUE |
|---|---|---|
| L1,L2 | COIL | 2.2 μH |
| Ci | CERAMIC CONDENSER | 4.7 μF |
| Co1 Co2 | CERAMIC CONDENSER | 10 μF |

SWITCHING POWER SUPPLY AND PORTABLE DEVICE

CROSS REFERENCE TO RELATED APPLICATIONS AND INCORPORATION BY REFERENCE

This application is based upon and claims the benefit of priority from prior Japanese Patent Applications No. P2008-135964 filed on May 23, 2008, the entire contents of which are incorporated herein by reference.

TECHNICAL FIELD

The present invention relates to a switching power supply which reduces the loss at the time of light load, and improves efficiency. In particular, the present invention relates a switching power supply for adopting the current mode switching for detecting a coil current of an output side coil and performing switching control, and a portable device which mounts the aforementioned switching power supply and reduces the power consumption.

BACKGROUND ART

In an operation of switching power supply, the power consumption loss by circuit current becomes large relatively rather than the loss over load current, in a state with a low amount value of load current. Accordingly, the efficiency of switching power supply was reducing in operation of the state with a low amount value of load current.

In a switching power supply for controlling an electric energy supplied to load by ON and OFF control of a switching element provided inside, conventionally, in order to reduce the loss at the time of the light load of switching power supply, intermittent control which suspends a switching operation of the switching element is performed (for example, refer to Patent Literature 1). In the switching power supply, which performs the intermittent control, in order to perform the intermittent control of the voltage according to output voltage, a comparator for comparing with a reference voltage is provided.

And in the comparator, when being verified that became light load and the voltage according to output voltage became higher than the reference voltage, the switching control operation of the switching element by a driver circuit is suspended. Then, when it is verified that the output voltage became low by providing this comparator with a hysteresis characteristic, the switching control operation of the switching element by the driver circuit is resumed. At the time of light load, by repeating such the operation, the intermittent control by the comparator for intermittent control is performed, and the efficiency of switching power supply can be applied high.

However, this conventional switching power supply needs to provide the comparator for the intermittent control for performing the intermittently switching operation of the switching element by the driver circuit, in order to apply the high efficiency at the time of light load. Thus, only worth provided with the comparator for the intermittent control increased the circuit structure, which composes the switching power supply, and the miniaturization of the portable device, which mounts such the switching power supply, has been prevented.

Then, in order to keep up a high-efficiency, without newly providing the circuit for the intermittent control at the time of light load, a switching power supply which adopts SLLM (Simple Light Load Mode) control technique is proposed (for example, refer to Patent Literature 2).

According to the switching power supply which adopts this SLLM control technique, when the difference of the output voltage and the reference voltage becomes small, at the time of no-load or light load, it is verified in a comparator that the size of current detection voltage is larger than the difference of the output voltage and the reference voltage by giving offset voltage to the current detection voltage indicating the current value which flows through the detected coil. The intermittent control of the switching operation of the switching element can be performed until the difference of the output voltage and the reference voltage becomes large, since the oscillator signal of the oscillator which sets the switching element to ON can be no effect at this time. Therefore, since it becomes unnecessary to have the configuration which adds the comparator for performing intermittent control, the efficiency is improved rather than the switching power supply by the PWM control in current mode and the miniaturization of the device can be achieved, in the time of light load or no-load.

Citation List

Patent Literature 1: Japanese Patent Application Laying-Open Publication No. H06-303766

Patent Literature 2: Pamphlet of International Publication No. WO2005/078910

SUMMARY OF THE INVENTION

Technical Problem

However, at the time of light load or no-load, it is difficult to keep up the high efficiency of switching power supply, and the reduction in efficiency is so more remarkable that the output current value is small, also in the switching power supply which adopts this SLLM control technique.

In order to suppress the reduction in the efficiency of switching power supply, if circuit current is suppressed until the level, which can usually operate at the time of switching, there was a limit on the operation speed.

The object of the present invention is to provide a switching power supply and a portable device, which achieve a high-efficiency in a full load area.

Solution to Problem

In a switching power supply according to the present invention, the new SLLM control called DSLLM (Deep Simple Light Load Mode) control is introduced as a method for improving power supply efficiency in a full load area.

According to an aspect of the invention, a switching-power supply comprises: a switching element which is connected to a power supply voltage and performs ON and OFF operation; a control circuit for performing ON and OFF control of the switching element; a coil by which the amount of current value which flows through the switching element is controlled; a capacitor which is connected to the coil and performs a rectifying operation with the coil; an oscillator for outputting an oscillator signal for controlling the switching element into ON for every constant period to the control circuit; a first comparator for comparing a current detection voltage which transforms a detection current which flows through the coil into a voltage, and the feedback voltage according to a difference of a voltage according to an output voltage outputted from a connection node between the capacitor and the coil with a reference voltage; and a second comparator for comparing a threshold voltage set as a voltage value which is higher than the current detection voltage and is lower than the power supply voltage, with the feedback voltage.

According to another aspect of the invention, a switching-power supply comprises: a first switching power supply comprising: a first switching element connected to a power supply voltage and for performing ON and OFF operation; a first control circuit for performing ON and OFF control of the first switching element; a first coil by which an amount of current value which flows through the first switching element is controlled; a first capacitor connected to the first coil and for performing a rectifying operation with the first coil; an oscillator for outputting a first oscillator signal for controlling the first switching element into ON for every constant period to the first control circuit; a first of first comparator for comparing a first current detection voltage which transforms a detection current which flows through the first coil into a voltage and a first feedback voltage according to the difference of a voltage according to a first output voltage outputted from a connection node of the first capacitor and the first coil, with a reference voltage; and a second of first comparator for comparing a first threshold voltage set as a voltage value which is lower than the power supply voltage and is higher than the first current detection voltage, with the first feedback voltage; and a second switching power supply comprising: a second switching element connected to the power supply voltage and for performing ON and OFF operation; a second control circuit for performing ON and OFF control of the second switching element; a second coil by which an amount of current value which flows through the second switching element is controlled; a second capacitor connected to the second coil and for performing a rectifying operation with the second coil; an oscillator for outputting a second oscillator signal for controlling the second switching element into ON for every constant period to the second control circuit; a first of second comparator for comparing a second current detection voltage which transforms a detection current which flows through the second coil into a voltage and a second feedback voltage according to the difference of a voltage according to a second output voltage outputted from a connection node of the second capacitor and the second coil, with the reference voltage; and a second of second comparator for comparing a second threshold voltage set as a voltage value which is lower than the power supply voltage and is higher than the second current detection voltage, with the second feedback voltage, wherein the first switching power supply and the second switching power supply are provided with a two-channel configuration in parallel, and operate on a frequency in synchronization with the first oscillator signal and the second oscillator signal from the oscillator with which the 180 degrees phase shifts, respectively at the time of PWM operation.

According to another aspect of the invention, a portable device comprises a switching power supply, the switching power supply comprises a switching element which is connected to a power supply voltage and performs ON and OFF operation; a control circuit for performing ON and OFF control of the switching element; a coil by which the amount of current value which flows through the switching element is controlled; a capacitor which is connected to the coil and performs a rectifying operation with the coil; an oscillator for outputting an oscillator signal for controlling the switching element into ON for every constant period to the control circuit; a first comparator for comparing a current detection voltage which transforms a detection current which flows through the coil into a voltage, and the feedback voltage according to a difference of a voltage according to an output voltage outputted from a connection node between the capacitor and the coil with a reference voltage; and a second comparator for comparing a threshold voltage set as a voltage value which is higher than the current detection voltage and is lower than the power supply voltage, with the feedback voltage.

According to another aspect of the invention, a portable device comprises a switching power supply, the switching power supply comprises a first switching power supply comprising: a first switching element connected to a power supply voltage and for performing ON and OFF operation; a first control circuit for performing ON and OFF control of the first switching element; a first coil by which an amount of current value which flows through the first switching element is controlled; a first capacitor connected to the first coil and for performing a rectifying operation with the first coil; an oscillator for outputting a first oscillator signal for controlling the first switching element into ON for every constant period to the first control circuit; a first of first comparator for comparing a first current detection voltage which transforms a detection current which flows through the first coil into a voltage and a first feedback voltage according to the difference of a voltage according to a first output voltage outputted from a connection node of the first capacitor and the first coil, with a reference voltage; and a second of first comparator for comparing a first threshold voltage set as a voltage value which is lower than the power supply voltage and is higher than the first current detection voltage, with the first feedback voltage; and a second switching power supply comprising: a second switching element connected to the power supply voltage and for performing ON and OFF operation; a second control circuit for performing ON and OFF control of the second switching element; a second coil by which an amount of current value which flows through the second switching element is controlled; a second capacitor connected to the second coil and for performing a rectifying operation with the second coil; an oscillator for outputting a second oscillator signal for controlling the second switching element into ON for every constant period to the second control circuit; a first of second comparator for comparing a second current detection voltage which transforms a detection current which flows through the second coil into a voltage and a second feedback voltage according to the difference of a voltage according to a second output voltage outputted from a connection node of the second capacitor and the second coil, with the reference voltage; and a second of second comparator for comparing a second threshold voltage set as a voltage value which is lower than the power supply voltage and is higher than the second current detection voltage, with the second feedback voltage, wherein the first switching power supply and the second switching power supply are provided with a two-channel configuration in parallel, and operate on a frequency in synchronization with the first oscillator signal and the second oscillator signal from the oscillator with which the 180 degrees phase shifts, respectively at the time of PWM operation.

ADVANTAGEOUS EFFECTS OF INVENTION

According to the present invention, the switching power supply and the portable device, which achieve a high-efficiency in a full load area, can be provided.

According to the switching power supply of a present invention, since the efficiency at the time of no-load required with a cellular phone etc. is substantially improvable, the extension of a stand by time period can be achieved.

Moreover, according to the switching power supply of the present invention, overall circuit current can be reduced, without worsening in particular a precipitous load response etc.

Moreover, according to the switching power supply of the present invention, the power supply efficiency can be improved and battery life can be extended for mobile product power supply markets, such as a cellular phone.

BRIEF DESCRIPTION OF DRAWINGS

FIG. 11 shows characteristic data of the switching power supply according to the second embodiment of the present invention.

FIG. 12 shows absolute maximum rating data of the switching power supply according to the second embodiment of the present invention.

FIG. 13 shows operating conditions of the switching power supply according to the second embodiment of the present invention.

FIG. 14 shows electrical characteristics of a prototype example 1 of the switching power supply according to the second embodiment of the present invention.

FIG. 15 shows electrical characteristics of a prototype example 2 of the switching power supply according to the second embodiment of the present invention.

FIG. 16 is a relationship chart showing the relation between terminal numbers and terminal names of the switching power supply according to the second embodiment of the present invention.

DESCRIPTION OF EMBODIMENTS

Figure 1:
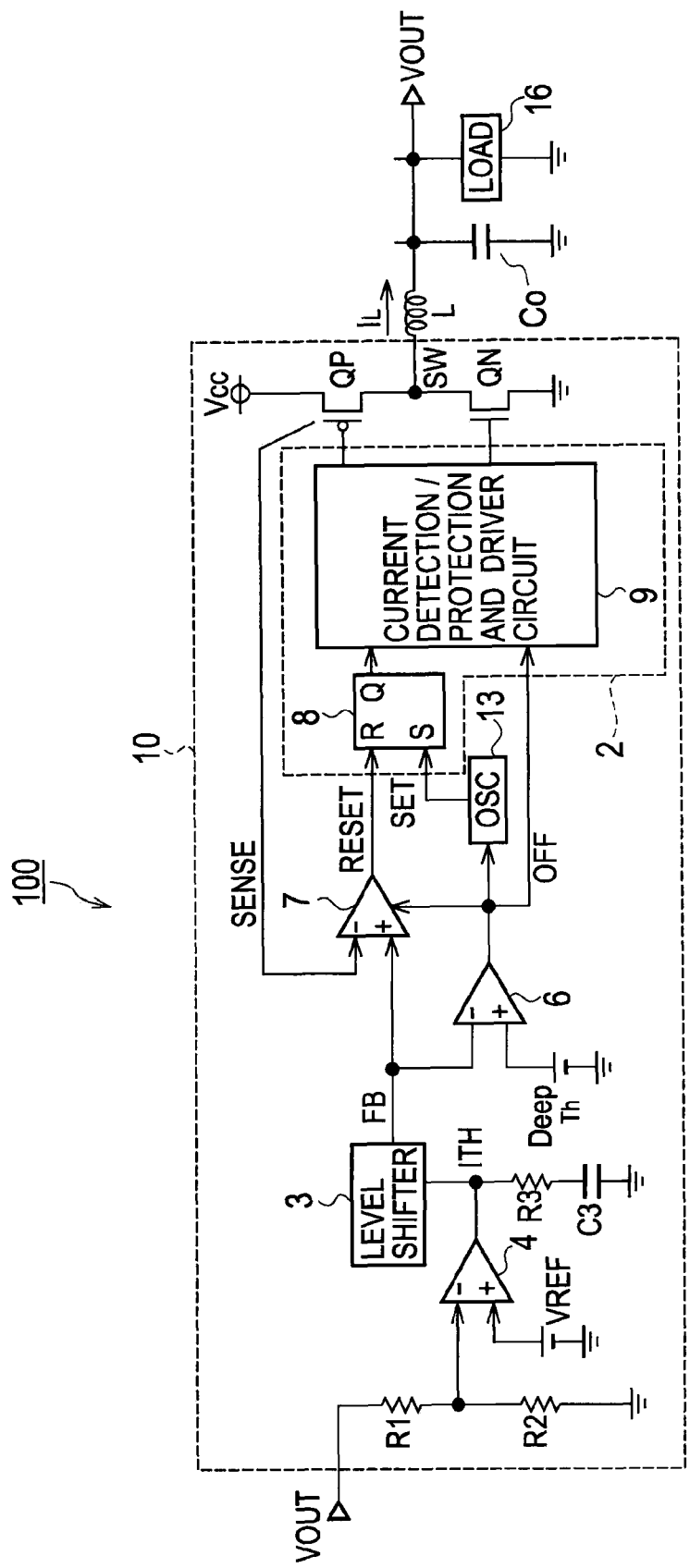
FIG. 1 is a schematic circuit configuration chart of a switching power supply according to a first embodiment of the present invention.

Various embodiments of the present invention will be described with reference to the accompanying drawings. There will be described embodiments of the present invention, with reference to the drawings, where like members or elements are designated by like reference characters to eliminate redundancy, and some circuit blocks and their subsidiary regions are designated by the same reference characters for simplicity. Drawings are schematic, not actual, and may be inconsistent in between in scale, ratio, etc.

The embodiments to be described are embodiments of a technical concept or spirit of the present invention that is not limited to embodied specifics, and may be changed without departing from the spirit or scope of claims.

First Embodiment (Circuit Configuration)

As shown in FIG. 1, a configuration of the switching power supply 100 according to a first embodiment of the present invention includes a switching regulator 10 of a single channel, a coil L connected to the switching terminal SW, and a capacitor Co and a load 16 connected to the coil L. As the load 16 connected to the switching regulator 10, mobile computing devices, such as a cellular phone, a smart phone, PDA, a portable media player, a digital camera, and wireless LAN, etc. are applicable, for example.

A power supply voltage Vcc is an input power voltage, and PWM current mode PWM and an output voltage VOUT by which DSLLM control is performed are obtained from the both terminals of the load 16.

As shown in FIG. 1, a schematic circuit configuration of the switching power supply 100 according to the first embodiment of the present invention includes: switching elements (QP, QN) which are connected to the power supply voltage Vcc and perform ON and OFF operation; a control circuit 2 for performing ON and OFF control of the switching elements; a coil L by which the flowing amount of current value is controlled by the switching elements; a capacitor Co which is connected to the coil L and performs rectifying operation with the coil L; an oscillator (OSC) 13 for outputting an oscillator signal (SET) for controlling the switching elements to turn ON for every constant period to the control circuit 2; a current detection voltage (SENSE) for detecting a coil current IL which flows through the coil L and is transformed into voltage; a first comparator 7 for comparing a feedback voltage FB according to a difference between a reference voltage VREF and a voltage according to the output voltage VOUT outputted from a connection node of the capacitor Co and the coil L; and a second comparator 6 for comparing the feedback voltage FB and a deep threshold voltage DeepTh which is set as the voltage value which is lower than the power supply voltage Vcc and is higher than SENSE.

Furthermore, the switching power supply 100 according to the first embodiment may include a voltage comparator 4 into which the voltage according to the output voltage VOUT and the reference voltage VREF are inputted. In this case, a voltage according to the difference between the voltage according to the output voltage VOUT outputted from the voltage comparator 4 and the reference voltage VREF is supplied to the first comparator 7.

The voltage according to the output voltage VOUT is a voltage divided value of voltage by resistances R1 and R2 connected between the connection node of the coil L and the capacitor Co and ground potential in series. The voltage comparator 4 is composed of a differential amplifier called an error amplifier or a mutual conductance amplifier (Gm).

Furthermore, in the switching power supply 100 according to the first embodiment, an output terminal ITH of the voltage comparator 4 may include a level shifter 3 for performing level conversion of the voltage outputted from the voltage comparator 4. Moreover, a series circuit of a resistance R3 and a capacitor C3 is connected to the output terminal ITH.

Moreover, the switching power supply 100 according to the first embodiment may include a soft start circuit (not shown) for being connected to the voltage comparator 4 and giving an inclination to rising of the output voltage VOUT.

Moreover, in the switching power supply 100 according to the first embodiment, the control circuit 2 may include: a flip-flop circuit 8 where the oscillator signal SET from the OSC 13 is inputted into a set terminal (S), and a reset signal RESET from the first comparator 7 is inputted into a reset terminal (R); and a current detection/protection and driver circuit 9 for controlling ON and OFF of the switching elements according to the output from the flip-flop circuit 8.

The switching element may compose CMOSFET composed of p-channel MOSFETQP by which the drain is connected to the coil L and the source is connected to the power supply voltage Vcc, and n-channel MOSFETQN by which the drain is connected to the coil L and the source is connected to ground potential.

(Circuit Operation Control Mode)

The switching power supply 100 according to the first embodiment achieves a fast transient response with the current mode PWM control system. The switching operation is performed in PWM mode in the state of heavy loading, and DSLLM control is performed so that efficiency may be improved when load is light.

-Synchronizing Rectification-

The switching power supply 100 according to the first embodiment can cut down the power consumption for an externally connected rectifying element by synchronizing rectification control rather than the conventional DC/DC converter IC (Integrated Circuits). Moreover, the power consumption of the whole switching power supply can be reduced by reducing the short circuit conduction current at the time of operation due to p/n short circuit conduction preventing function based on the element structure.

-Current Mode PWM Control-

A schematic circuit configuration for explaining a current mode PWM control applied to the switching power supply 100 according to the first embodiment is expressed as shown in FIG. 1.

Figure 2:
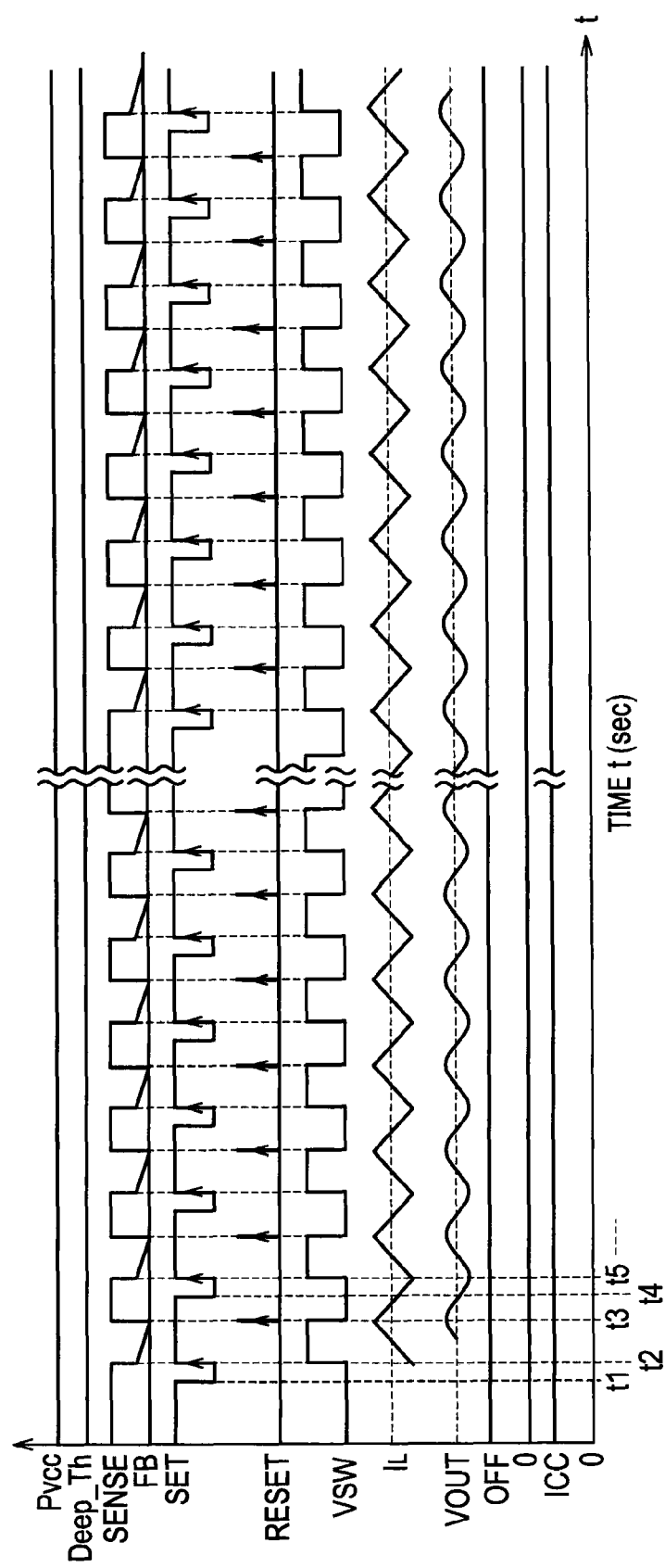
FIG. 2 is a timing chart of a current mode PWM control explaining an operation at the time of the heavy loading of the switching power supply according to the first embodiment of the present invention.
Figure 3:
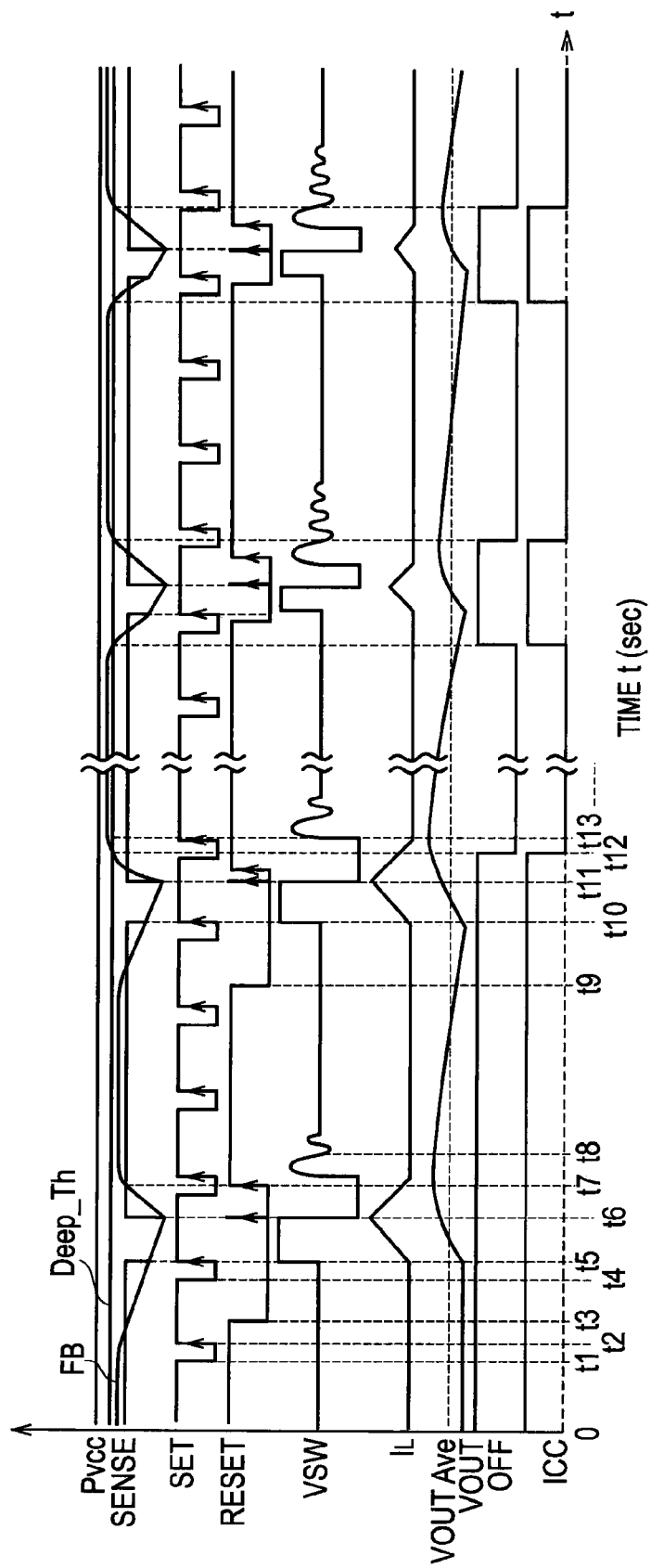
FIG. 3 is a timing chart for explaining an operation at the time of the light load or the time of no-load of the switching power supply according to the first embodiment of the present invention, and is a timing chart for explaining SLLM control and DSLLM control of the current mode PWM control.

Moreover, a timing chart at the time of heavy load and light load for explaining a current mode PWM control applied to the switching power supply 100 according to the first embodiment is expressed as shown in FIG. 2 and FIG. 3, respectively.

The loop, which returns the coil current to voltage feedback, is added, and the PWM control signal is synthesized.

The PWM oscillating frequency is about 2 MHz, for example. The p-channel MOSFET is turned ON (n-channel MOSFET is turned OFF) by the SET signal outputted from the OSC 13, and the coil current IL increases.

When the current detection voltage SENSE indicating the feed back conversion voltage of the coil current IL is in agreement with the feedback voltage FB, the first comparator 7 outputs the reset signal RESET, and turns OFF (n-channel MOSFET is turned ON) in the remaining periods of the fixed cycle period. The PWM control repeats the above-mentioned operation.

-SLLM Control-

According to the SLLM control, since the switching pulse is turned OFF while it has been made to operate by the usual PWM control loop when going into the light load from the PWM of heavy load or when going into the heavy load from the light load, it can be made to operate linearly, without the voltage drop and the degrading the transient response characteristic by change etc. of light load and heavy load.

Although the PWM control loop operation is performed by the output signal SET of OSC 13 and the output signal RESET of the first comparator 7, when being in the light load state, it becomes an operation which the RESET signal continues outputting, as shown in FIG. 3. Accordingly, since the switching is turned OFF, the control by which a switching pulse is thinned out is performed. That is, the switching loss can be reduced and the efficiency can be improved by performing the intermittent sampling action of the switching.

-DSLLM Control-

Figure 5:
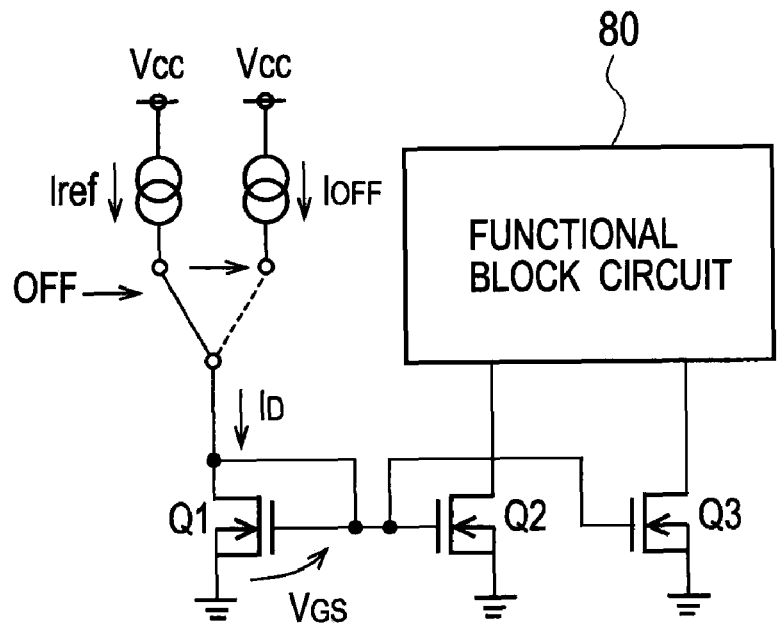
FIG. 5 is a simplified circuit configuration chart for explaining a circuit current reduction operation, in the switching power supply according to the first embodiment of the present invention.

A timing chart for explaining the SLLM control and the DSLLM control of the current mode PWM control applied to the switching power supply 100 according to the first embodiment is expressed as shown in FIG. 5.

In a mostly no-load state, the loss by the circuit current of the switching power supply affects the efficiency η greatly except the switching power loss.

The circuit OFF signal can be outputted at the time of no-load, and the operation of the circuit block unrelated to the operation at the times of no-load, such as the OSC 13, the first comparator 7, the current detection/protection and driver circuit 9, can be stopped, and the circuit current can be reduced by the second comparator 6 for detecting a no-load state, in addition to the conventional SLLM control to which the intermittent sampling action of the switching is performed at the time of the light load.

Thereby, the circuit current of whole of the switching power supply 100 at the time of no-load can be reduced substantially, and the efficiency at the time of no-load can be further improved by reducing the self-consumption loss by the circuit current of the switching power supply 100.

(Operation Timing Chart at the Time of Heavy Load)

A timing chart of current mode PWM control for explaining the operation at the time of the heavy load of the switching power supply 100 according to the first embodiment is expressed as shown in FIG. 2.

In the switching power supply according to the first embodiment, the synchronizing rectification method is adopted at the time of the heavy load. Moreover, as the power transistor which composes the switching element for performing ON and OFF operation, the p-channel MOSFET/n-channel MOSFET of low on resistance is built in. The on resistance of p-channel MOSFET is about 0.6 Ω (Typ.), for example, and the on resistance of n-channel MOSFET is about 0.5 Ω (Typ.), for example. Accordingly, the improvement of the efficiency at the time of the heavy load is achievable.

In FIG. 2, each operation waveform of the power level PVcc for supplying the power supply voltage Vcc, the deep threshold voltage DeepTh, the current detection voltage SENSE, the feedback voltage FB, the SET signal supplied from the OSC 13, the reset signal RESET supplied from the first comparator 7, the switching voltage VSW in the switching terminal SW, the coil current IL, the output voltage VOUT, the off signal OFF supplied from the second comparator 6, and the circuit current at the time of active operation Icc supplied from the power supply voltage Vcc, is shown.

Since it is necessary to supply the output current of a specified level to the load 16 at the time of the heavy load, the circuit current at the time of active operation Icc of the specified level flows through p-channel MOSFETQP.

Since the value of the feedback voltage FB is smaller than the value of the deep threshold voltage DeepTh, the off signal OFF supplied from the second comparator 6 is held high-level.

(a) In the time t1, the SET signal is turned to the low level from the high level.
(b) In the time t2, when the SET signal is turned to the high level from the low level, the switching voltage VSW in the switching terminal SW is turned to the high level. Moreover, the current detection voltage SENSE reduces rapidly and further reduces gradually with the rise of the coil current IL.
(c) In the time t3, when the current detection voltage SENSE reduces rather than the feedback voltage FB, the reset signal RESET is outputted from the first comparator 7, the switching voltage VSW is turned to the low level, the coil current IL and the output voltage VOUT drop, and the SET signal is turned to the low level from the high level after specified time elapse.
(d) In the time t5, when the SET signal is turned to the high level from the low level, the switching voltage VSW in the switching terminal SW is turned to the high level. Hereinafter, the same operation is repeated.

(Operation Timing Chart at the Time of Light Load)

A timing chart for explaining the operation at the time of light load or no-load, and for explaining the SLLM control and the DSLLM control of the current mode PWM control is expressed as shown in FIG. 3.

In the switching power supply according to the first embodiment, the current mode DSLLM (Deep Simple Light Load Mode) control is adopted at the time of the light load. Accordingly, the switching power loss PD (SW) and the gate charging up and discharging power loss PD (Gate) acting as the cause of reducing efficiency at the time of the light load can be reduced. Furthermore, self-loss is substantially reducible by applying the operating current of the switching power supply according to the first embodiment into the minimum. Accordingly, an extensive improvement of the efficiency at the time of the light load is achievable.

In FIG. 3, each operation waveform of the power level PVcc for supplying the power supply voltage Vcc, the deep threshold voltage DeepTh, the current detection voltage SENSE, the feedback voltage FB, the SET signal supplied from the OSC 13, the reset signal RESET supplied from the first comparator 7, the switching voltage VSW in the switching terminal SW, the coil current IL, the output voltage VOUT, the off signal OFF supplied from the second comparator 6, and the circuit current at the time of active operation Icc supplied from the power supply voltage Vcc, is shown. VOUT Ave is an average of the output voltage VOUT.

As for the switching power supply 100 according to the first embodiment, when the value of the deep threshold voltage DeepTh is larger than the value of the feedback voltage FB, the high-level off signal OFF is sent from the second comparator 6 to the OSC 13, the first comparator 7, and the control circuit 2, and the SET signal from OSC 13 is applied to invalidity, and the switching elements QP and QN are set to OFF.

Moreover, as for the switching power supply 100 according to the first embodiment, when the value of the feedback voltage FB is larger than the value of the deep threshold voltage DeepTh in the second comparator 6, the off signal OFF supplied from the second comparator 6 to the OSC 13, the first comparator 7, and the control circuit 2 is intercepted, and the first comparator 7 sends the reset signal RESET for the control circuit 2, and sets the circuit current at the time of active operation Icc to OFF.

Moreover, as for the switching power supply 100 according to the first embodiment, when the value of the current detection voltage SENSE is larger than the value of the feedback voltage FB, the first comparator 7 sets the output of the reset signal RESET to the low level.

(a) In the time t1, the SET signal is turned to the low level from the high level.
(b) In the time t2, the SET signal is turned to the high level from the low level, and the feedback voltage FB is reduced rather than the current detection voltage SENSE.
(c) In the time t3, the reset signal RESET supplied from the first comparator 7 for the control circuit 2 is turned to the low level.
(d) In the time t4, the SET signal is turned to the low level from the high level.
(e) In the time t5, the SET signal is turned to the high level from the low level, and the switching voltage VSW in the switching terminal SW is turned to the high level. Moreover, the current detection voltage SENSE is reduced rapidly and is further reduced gradually with the rise of the coil current IL.
(f) In the time t6, when the current detection voltage SENSE is reduced rather than the feedback voltage FB, the reset signal RESET is outputted from the first comparator 7, the switching voltage VSW is turned to the deep-off level, the coil current IL is reduced, and the output voltage VOUT drops after some time delay passage. The SET signal is turned to the low level from the high level after specified time elapse.
(g) In the time t7, when the feedback voltage FB becomes higher than the current detection voltage SENSE, the high-level reset signal RESET is outputted from the first comparator 7.
(h) In the time t8, the switching voltage VSW is turned to the off-level (zero level) from the deep-off level after oscillation of a number cycle.

(i) In the time t9, the reset signal RESET is turned to the low level from the high level, and the feedback voltage FB is reduced rather than the current detection voltage SENSE.

(j) In the time t10, the SET signal is turned to the high level from the low level, and the switching voltage VSW is turned to the high level. Moreover, the current detection voltage SENSE is reduced rapidly and further is reduced gradually with the rise of the coil current IL.

(k) In the time t11, when the current detection voltage SENSE is reduced rather than the feedback voltage FB, the reset signal RESET is outputted from the first comparator 7, the switching voltage VSW is turned to the deep-off level, the coil current IL is reduced, and the output voltage VOUT drops after some time delay passage. The SET signal is turned to the low level from the high level after specified time elapse.

(l) In the time t12, when the feedback voltage FB becomes higher than the deep threshold voltage DeepTh, the off signal OFF of the low level is sent from the second comparator 6 to the OSC 13, the first comparator 7, and the control circuit 2, and the SET signal from the OSC 13 is validated, and the switching element QP is set to ON.

(m) In the time t13, when the SET signal is turned to the high level from the low level, the switching voltage VSW is turned to the off-level (zero level) from the deep-off level after oscillation of a number cycle. Furthermore, when the feedback voltage FB becomes lower than the deep threshold voltage DeepTh after specified time elapse, the high-level off signal OFF is sent from the second comparator 6 to the OSC 13, the first comparator 7, and the control circuit 2, and the SET signal from OSC 13 is applied invalidity and the switching element is set to OFF. Hereinafter, the same operation is repeated.

(Configuration for Reducing Circuit Current)

Figure 4:
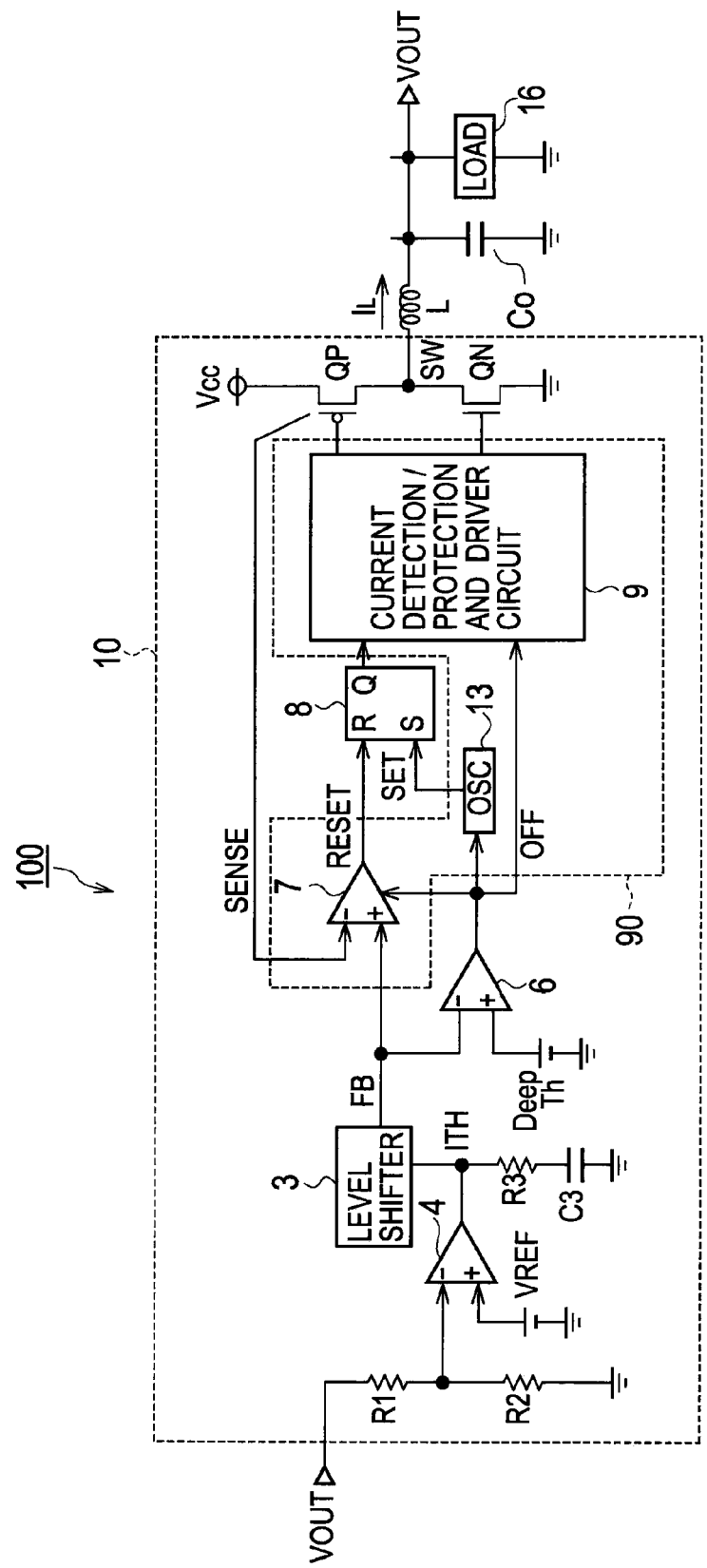
FIG. 4 is a schematic circuit configuration chart for explaining a circuit current reduction block, in the switching power supply according to the 1st embodiment of the present invention.

In the switching power supply 100 according to the first embodiment, a schematic circuit configuration for explaining the circuit current reduction block 90 is expressed as shown in FIG. 4. In the switching power supply 100 according to the first embodiment, since the operation can be temporarily stopped in the first comparator 7, the OSC 13, and the current detection/protection and driver circuit 9 that composes the circuit current reduction block 90 and the circuit current values can be reduced with the high-level OFF signal outputted from the second comparator 6, the reduction in efficiency can be suppressed at the time of light load or no-load.

Figure 6:
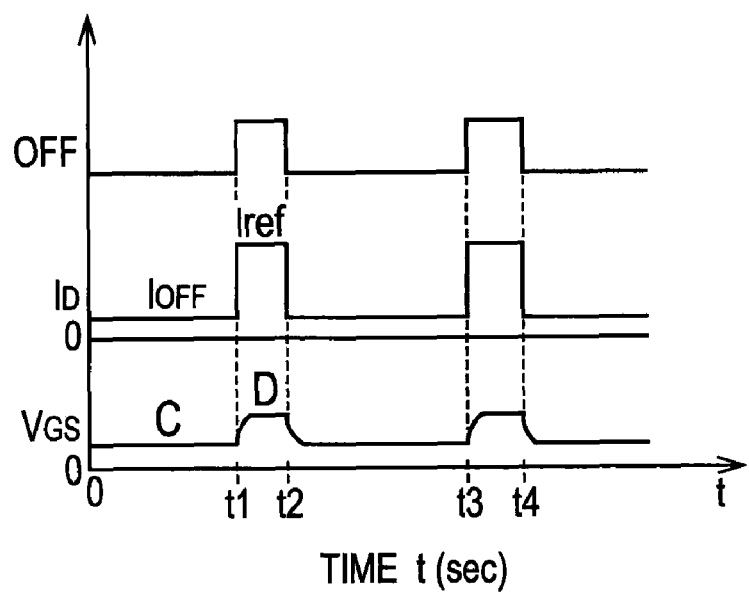
FIG. 6 is a timing chart corresponding to FIG. 8.

In the switching power supply 100 according to the first embodiment, a circuit configuration simplified for explaining a circuit current reduction operation is expressed as shown in FIG. 5. The functional block circuits 80 is a circuit including the circuit current reduction block 90 which is composed of the current detection/protection and driver circuit 9, the first comparator 7, and the OSC 13. Moreover, the operational timing chart corresponding to FIG. 5 is expressed as shown in FIG. 6.

The value of drain current ID supplied to the n-channel MOS transistor Q1 according to the OFF signal outputted from the second comparator 6 can be switched as follows. That is, an operation, which switches the current value supplied to the switching element from the input voltage Vcc to the off-state current IOFF of the low level and the current Iref of the reference level, is performed.

Figure 7:
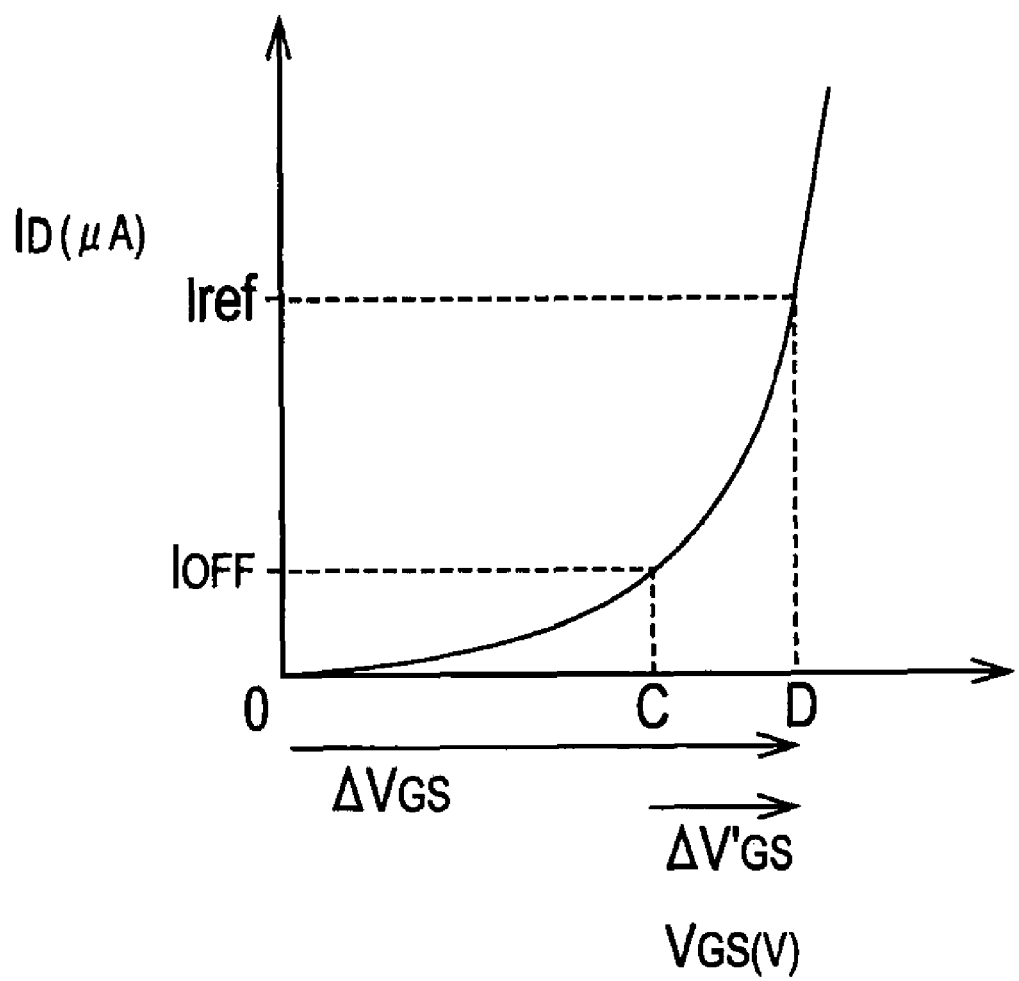
FIG. 7 is a figure for explaining the circuit current reduction operation on the drain current $I_D$ versus gate to source voltage $V_{GS}$ characteristics of MOSFET.

A characteristics chart for explaining circuit current reduction operation on the drain current ID versus gate to source voltage VGS characteristics of MOSFET is expressed as shown in FIG. 7.

When the circuit current is reduced by the off signal OFF supplied from the output of the second comparator 6 at the time of the DSLLM control, in the case where the drain current ID is set to zero (µA) and it restores a circuit operation from the state of $V_{GS}$=0 (V), the amount of variations $\Delta V_{GS}$ from $V_{GS}$=0 (V) to D point is large, the time is needed, and the load response characteristics get worse.

Then, at the time of circuit off, $V_{GS}$ is generated in minute off-state current IOFF (C point), and high-speed load response characteristics can be achieved by allowing to restore to normal operation only by slight amount of variations $\Delta V_{GS}$' from C point to D point.

Therefore, since the circuit current at the time of active operation Icc in this state decreases, the efficiency of switching power supply can be improved.

According to the switching power supply according to the embodiment of the invention, and the IC (Integrated Circuit) which integrates this switching power supply, a high-efficiency is achievable in a full load area.

(Efficiency Comparison)

Figure 8:
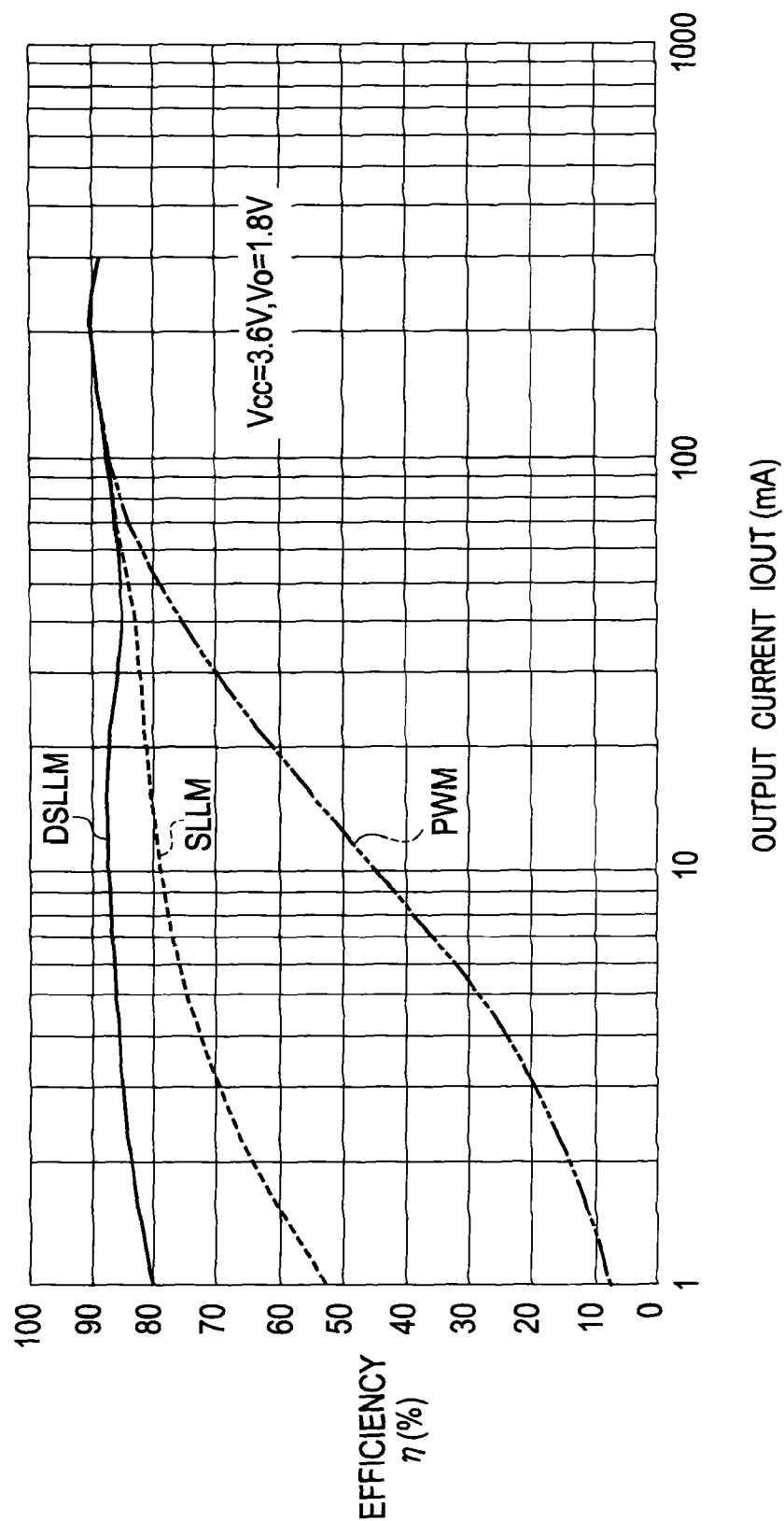
FIG. 8 is a characteristics chart showing the relation between the efficiency η and the output current IOUT of the switching power supply according to the first embodiment of the present invention, and is a comparison chart of the efficiency characteristic in the case of DSLLM control, SLLM control, and PWM control.

A characteristics showing the relation between the efficiency η and the output current IOUT of the switching power supply 100 according to the first embodiment, and a comparison chart of the efficiency characteristic in the case of the DSLLM control, the SLLM control, and the PWM control are expressed as shown in FIG. 8.

In the switching power supply 100 according to the first embodiment, the improvement effect of the efficiency η is observed in the low current range of the output current IOUT by combining the SLLM control compared with the case of only current mode PWM control. However, in the low current range of the output current IOUT, the efficiency η is further improved by further combining DSLLM control. Therefore, the switching power supply according to the first embodiment can improve each of the efficiency at the time of the light load and the heavy load, and can achieve a high-efficiency in a full load area.

According to the first embodiment, the switching power supply and the portable device, which achieve a high-efficiency in a full load area, can be provided.

According to the switching power supply according to the first embodiment, since the efficiency at the time of no-load required with a cellular phone etc. is substantially improvable, the extension of a stand by time period can be achieved.

Moreover, according to the switching power supply according to the first embodiment, overall circuit current can be reduced, without worsening in particular a precipitous load response etc.

Moreover, according to the switching power supply according to the first embodiment, the power supply efficiency can be improved and battery life can be extended for mobile product power supply markets, such as a cellular phone.

Second Embodiment

Figure 9:
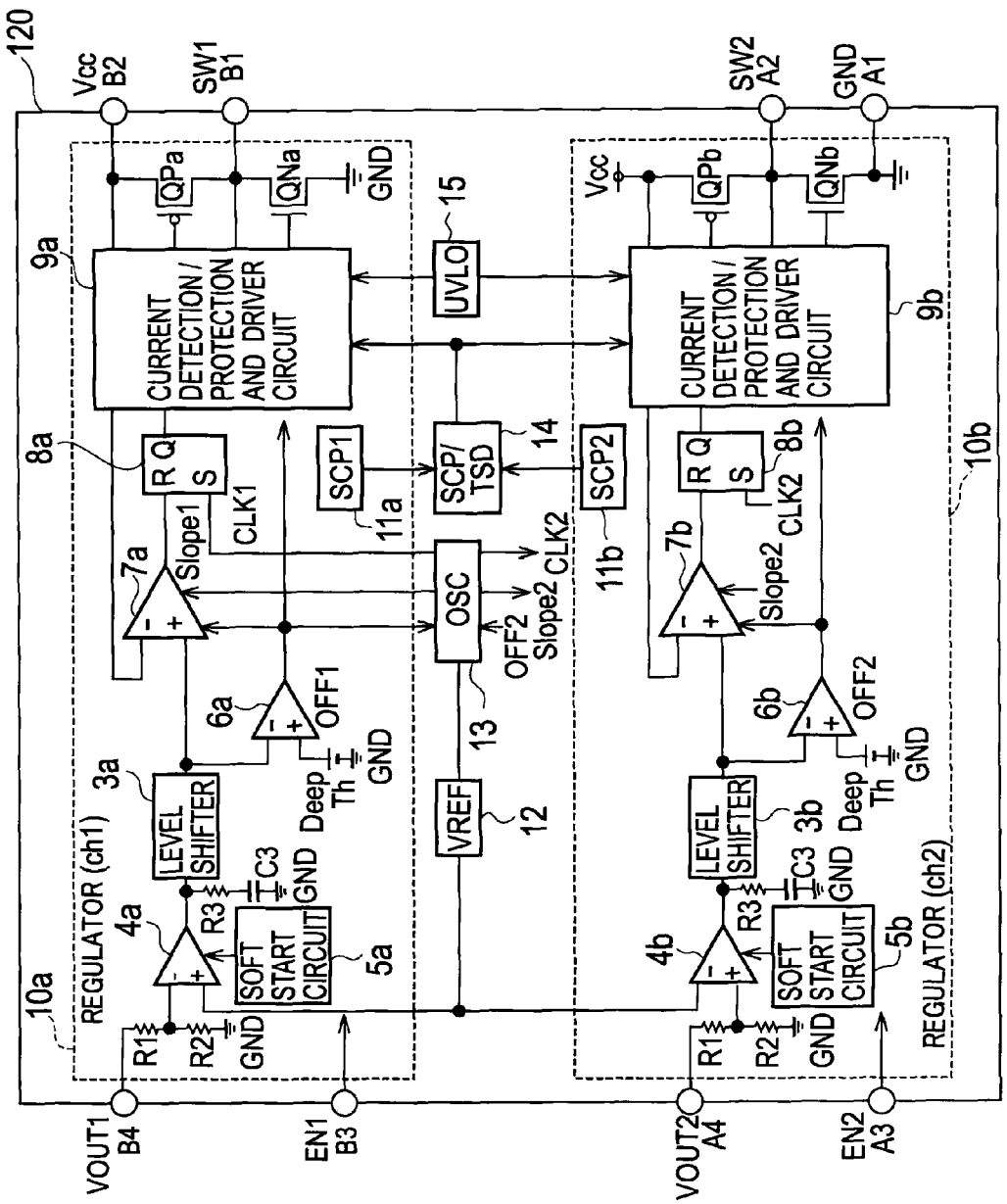
FIG. 9 shows a switching power supply according to a second embodiment of the present invention, and is a schematic circuit configuration chart of a two-channel configuration.

The switching power supply 120 according to a second embodiment of the present invention is provided with the two-channel configuration which arranges switching regulators 10a and 10b of a single channel to two-piece parallel, as shown in FIG. 9.

Although each switching terminal SW1 of the switching regulators 10a and 10b and SW2 are independently provided with a coil and a capacitor and a load which are connected to the coil, respectively, as well as the first embodiment, the illustration is omitted about these coil, capacitor, and load. As the load 16, mobile computing devices, such as a cellular phone, a smart phone, PDA, a portable media player, a digital camera, and wireless LAN, etc. are connectable as well as the first embodiment, for example.

The switching power supply 120 according to the second embodiment arranges the switching regulators 10a and 10b with a two-channel configuration, and operates on the frequency in synchronization with the first signal CLK1 and the second signal CLK2 from the OSC 13 to which 180 degrees phase shifts, respectively, at time of the PWM operation.

The power supply voltage Vcc is input power voltage, and the output voltage VOUT1 and VOUT2 by which the PWM current mode PWM and the DSLLM control are performed are obtained from the both terminals of load.

As shown in FIG. 9, the switching power supply 120 according to the second embodiment includes a first switching power supply including: first switching elements (QPa, QNa) connected to the power supply voltage Vcc and perform ON and OFF operation; first control circuits (8a, 9a) for performing ON and OFF control of the first switching elements QPa, QNa; a first coil L1 by which the amount of current value which flows through the first switching elements QPa, QNa is controlled; a first capacitor Co1 connected to the first coil L1 and performs rectifying operation with the first coil L1; an OSC 13 for outputting the first signal CLK1 for controlling the first switching elements QPa, QNa into ON for every constant period to the first control circuits (8a, 9a); and a first of first comparator 7a for comparing a first current detection voltage SENSE1 transformed the detection current which flows through the first coil L1 into voltage with a first feedback voltage FB1 according to the difference of a voltage according to first output voltage VOUT1 outputted from the connection node between the first capacitor Co1 and the first coil L1 and a reference voltage VREF, and a second of first comparator for comparing a first deep threshold voltage DeepTh which is set as voltage value which is lower than the power supply voltage Vcc and is higher than the first current detection voltage SENSE1 with the first feedback voltage FB1.

Moreover, as shown in FIG. 9, the switching power supply 120 according to the second embodiment includes a second switching power supply including: second switching elements (QPb, QNb) connected to the power supply voltage Vcc and perform ON and OFF operation; second control circuits (8b, 9b) for performing ON and OFF control of the second switching elements QPb, QNb; a second coil L2 by which the amount of current value which flows through the second switching elements QPb, QNb is controlled; a second capacitor Co2 connected to the second coil L2 and performs rectifying operation with the second coil L2; an OSC 13 for outputting the second signal CLK2 for controlling the second switching elements QPb, QNb into ON for every constant period to the second control circuits (8b, 9b); and a first of second comparator 7b for comparing a second current detection voltage SENSE2 transformed the detection current which flows through the second coil L2 into voltage with a second feedback voltage FB2 according to the difference of a voltage according to second output voltage VOUT2 outputted from the connection node between the second capacitor Co2 and the second coil L2 and a reference voltage VREF, and a second of second comparator for comparing a second deep threshold voltage DeepTh which is set as voltage value which is lower than the power supply voltage Vcc and is higher than the second current detection voltage SENSE2 with the second feedback voltage FB2.

Each switching regulators 10a and 10b is sharing the reference voltage generator (VREF) 12, the OSC 13, the output short circuit/thermal shutdown detection signal generation unit (SCP/TSD) 14, and the malfunction prevention circuit at the time of low input voltage (UVLO) 15.

An output short circuit detecting circuit (SCP1) 11a is placed at the switching regulator 10a, and an output short circuit detecting voltage Vscp1 is supplied to the SCP/TSD 14. Moreover, an output short circuit detecting circuit (SCP2) 11b is placed at the switching regulator 10b, and an output short circuit detecting voltage Vscp2 is supplied to the SCP/TSD 14.

The SCP/TSD 14 supplies an output short circuit/thermal shutdown detection signal to the current detection/protection and driver circuits 9a and 9b.

The OSC 13 may supply slope compensation signals Slope1 and Slope2 to the first comparator 7a and 7b, respectively. Accordingly, a slope compensation waveform is superimposed on the current detection voltages SENSE1 and SENSE2, which are supplied to the first comparators 7a and 7b.

The cycle by the slope compensation waveform is a same synchronization with the SET signal from the OSC 13.

Moreover, the switching power supply 120 according to the second embodiment may include a voltage comparator 4a into which the voltage according to the output voltage VOUT1 and the reference voltage VREF are inputted. In this case, the voltage according to the difference of the voltage VREF according to output voltage VOUT1 outputted from the voltage comparator 4a and the reference voltage is supplied to the first comparator 7a.

Similarly, the switching power supply 120 according to the second embodiment may include a voltage comparator 4b into which the voltage according to the output voltage VOUT2 and the reference voltage VREF are inputted. In this case, the voltage according to the difference of the voltage according to output voltage VOUT2 outputted from the voltage comparator 4b and the reference voltage VREF is supplied to the first comparator 7b.

The voltage according to the output voltage VOUT1 is the voltage divided value of voltage by the resistances R1 and R2 connected between the connection node of the first coil L1 and the first capacitor Co1 and the ground potential in series.

Similarly, the voltage according to the output voltage VOUT2 is the voltage divided value of voltage by the resistances R1 and R2 connected between the connection node of the second coil L2 and the second capacitor Co2 and the ground potential in series. The voltage comparators 4a and 4b are composed of the differential amplifier called an error amplifier or a mutual conductance amplifier (Gm).

Moreover, in the switching power supply 120 according to the second embodiment, the output terminal of the voltage comparator 4a may be provided with a level shifter 3a for performing level conversion of the voltage outputted from the voltage comparator 4a. Moreover, a series circuit of the resistance R3 and the capacitor C3 is connected to the output terminal of the voltage comparator 4a.

Moreover, similarly, in the switching power supply 120 according to the second embodiment, the output terminal of the voltage comparator 4b may be provided with a level shifter 3b for performing level conversion of the voltage outputted from the voltage comparator 4b. Moreover, a series circuit of the resistance R3 and the capacitor C3 is connected also to the output terminal of the voltage comparator 4b.

Moreover, the switching power supply 120 according to the second embodiment may include a soft start circuit 5a connected to the voltage comparator 4a and for giving an inclination to rising of the output voltage VOUT1.

Moreover, similarly, the switching power supply 120 according to the second embodiment may include a soft start circuit 5b connected to the voltage comparator 4b and for giving an inclination to rising of the output voltage VOUT2.

Moreover, the switching power supply 120 according to the second embodiment includes: a flip-flop circuit 8a where the SET signal from the OSC 13 is inputted into a set terminal (S), and the reset signal RESET from the first comparator 7a is inputted into a reset terminal (R); and a current detection/protection and driver circuit 9a for controlling ON and OFF of the first switching element according to the output from the flip-flop circuit 8a.

Moreover, similarly, the switching power supply 120 according to the second embodiment includes: a flip-flop circuit 8b where the SET signal from the OSC 13 is inputted into a set terminal (S), and the reset signal RESET from the second comparator 7b is inputted into a reset terminal (R); and a current detection/protection and driver circuit 9a for controlling ON and OFF of the second switching element according to the output from the flip-flop circuit 8b.

The malfunctions prevention voltage at the time of low input voltages VUVLO1 and VUVLO2 are supplied to the current detection/protection and driver circuits 9a and 9b from the malfunction prevention circuit at the time of low input voltage (UVLO) 15, respectively.

The first switching element may be composed of CMOSFET composed of: p-channel MOSFET QPa by which the drain is connected to the first coil L1 and the source is connected to the power supply voltage Vcc; and n-channel MOSFET QNa by which the drain is connected to the first coil L1 and the source is connected to the ground potential.

Similarly, the second switching element may be composed of CMOSFET composed of: p-channel MOSFET QPb by which the drain is connected to the second coil L2 and the source is connected to the power supply voltage Vcc; and n-channel MOSFET QNb by which the drain is connected to the second coil L2 and the source is connected to the ground potential.

The circuit operation control mode of the switching power supply, which composes each channel, is the same as that of the first embodiment. That is, since it is the same as that of the first embodiment about the point of performing the synchronizing rectification control, the current mode PWM control, and the DSLLM control, the explanation is omitted.

Furthermore, since it is the same as that of the first embodiment also about the operational timing chart at the time of the heavy load, the operation timing chart at the time of the light load, and the configuration for circuit current reduction, the explanation is omitted.

-Two-Channel Switching Operation-

In the switching power supply 120 according to the second embodiment, each channel is operating on the frequency in synchronization with the SET signal with which the 180 degrees phase shifts, respectively, at the time of the PWM operation. The p-channel MOSFET of both channels is prevented from turning ON simultaneously by giving the phase shift of 180 degrees to the PWM operation of the channel 1 and the channel 2. Accordingly, the input ripple current, the surge current, etc. can be reduced.

(Efficiency)

Figure 10:
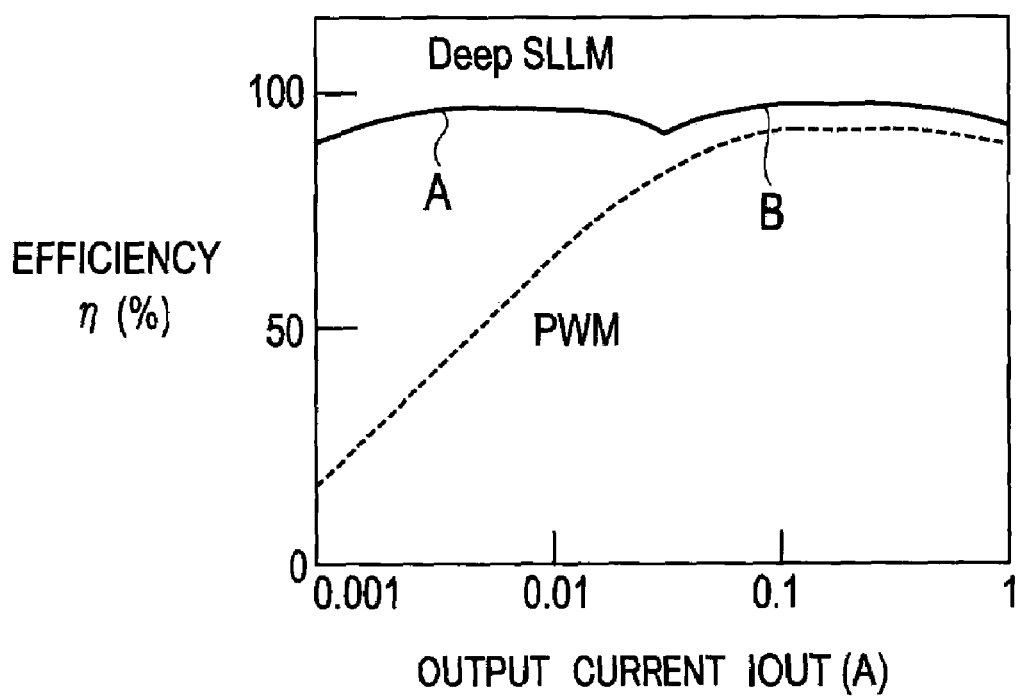
FIG. 10 is a characteristics chart showing the relation between the efficiency η and the output current $I_o$ of the switching power supply according to the second embodiment of the present invention.

In the switching power supply 120 according to the second embodiment, the relation between the output current IOUT and the efficiency η is expressed as shown in FIG. 10. In FIG. 10, a dotted line indicates the relation between the output current IOUT and the efficiency η only in the case of the current mode PWM control, the full line A indicates the case where the current mode DSLLM control is adopted, and the full line B indicates the case where the synchronizing rectification method is adopted. By combining the synchronizing rectification method of the full line B with the current mode DSLLM system of the full line A, it proves that the efficiency η (%) can be improved covering the wide scope of the output current IOUT.

The switching power supply according to the second embodiment can improve each of the efficiency at the time of the light load and the heavy load, and can achieve a high-efficiency in a full load area.

The switching power supply according to the second embodiment is a 1 chip FET built-in switching regulator, and composes the highly efficient voltage dropping type switching regulator of two channels. The low voltage of a two-channel output can be made from the lithium battery of one cell, etc.

The switching power supply according to the second embodiment is for low power applications, and since the switching frequency is fixed at 2 MHz, the miniaturization of externally connected application is possible.

The switching power supply according to the second embodiment achieves the high efficiency by unique pulse skip control method and synchronous rectification circuit, and achieves the fast transient response in abrupt changing of load value by adoption of the current modal control method.

(Feature)

The switching power supply according to the second embodiment has the following features.

(a) The current mode PWM control system achieves the fast transient response.
(b) The synchronizing rectification built-in (n-channel MOSFET/p-channel MOSFET), the SLLM control, and the DSLLM control achieve the high-efficiency in a full load area.
(c) The value of the power supply voltage Vcc is the range of about 2.3 V to 4.5 V.
(d) The value of the output current IOUT is about 300 mA Max./300 mA Max., for example.
(e) The value of the switching operation frequency Fosc is about 2 MHz, for example, and is fixation.
(f) Build in the soft start function.
(g) Build in the thermal shutdown (TSD) function, the malfunction prevention function at the time of low input voltage (UVLO), and the timer latch type short protection function.
(h) Build in the shutdown function. (Icc=0 μA (Typ))
(i) A wafer level chip-size package (WL-CSP) is adopted, and it is composed only about 1.1 mm×2.5 mm, for example.

(Specification)

The characteristic data of the switching power supply According to the second embodiment is expressed as shown in FIG. 11.

The value of the output voltage VOUT1/VOUT2 is about 1.2 V/1.8 V or about 1.2 V/1.85 V, for example.

Typically, the value of the UVLO detecting voltage VUVLO is about 2.1 V Typ, for example.

The value of circuit current at the time of standby ISTB is 0 μA.

The operational temperature range is about −30 to +85 degrees C., for example.

(Absolute Maximum Rating)

In the switching power supply according to the second embodiment, the absolute maximum rating data in ambient temperature Ta=25 degrees C. is expressed as shown in FIG. 12.

The value of the power supply voltage Vcc is about −0.3 to +7 V, for example. However, it is conditions not to exceed the power dissipation PD.

The value of enable voltage VEN1 is about −0.3 to +7 V, for example. Similarly, the value of enable voltage VEN2 is also about −0.3 to +7 V, for example.

The value of SW voltage VSW1 of SW1 terminal is about −0.3 to +7 V, for example. Similarly, the value of SW voltage VSW2 of SW2 terminal is also about −0.3 to +7 V.

The value of output current ISW1 of SW1 terminal is about 450 mA, for example. Similarly, the value of output current ISW2 of SW2 terminal is also about 450 mA, for example. However, it is conditions not to exceed the value of power dissipation PD.

The power dissipation PD is about 660 mW, for example. In this case, when using at not less than Ta=25 degrees C. at the time of 50 mm×58 mm×1.6 mm glass epoxy board mounting, 5.28 mW per degree C. is subtracted.

The operational temperature range Topr is about −30 to +85 degrees C., for example.

The storage temperature range Tstg is about −55 to +150 degrees C., for example.

The junction temperature Tjmax is about +150 degrees C., for example.

(Operating Conditions)

In the switching power supply according to the second embodiment, the operating conditions in ambient temperature Ta =−30 to +85 degrees C. are expressed as shown in FIG. 13. However, it is applied as Vcc Min.=2.7 V about the output voltage VOUT=1.8 V. Moreover, it is conditions not to exceed the power dissipation PD.

The values of the power supply voltage Vcc are the minimum of about 2.3 V, the typical of about 3.3 V, and the maximum of about 4.5 V, for example.

The values of the enable voltage VEN1 are the minimum of about 0 V and the maximum of about 4.5 V, for example. Similarly, the values of the enable voltage VEN2 are also the minimum of about 0 V and the maximum of about 4.5 V, for example.

The value of the average output current ISW1 which flows through the SW terminal 1 is the maximum of about 300 mA, for example. Similarly, the value of the average output current ISW2 which flows through the SW terminal 2 is also the maximum of about 300 mA, for example.

(Electrical Characteristics)

The electrical characteristics of the prototype example 1 of the switching power supply according to the second embodiment are expressed as shown in FIG. 14. So far as there is no specification in particular, they are the ambient temperature Ta=25 degrees C., the power supply voltage Vcc=3.3 V, and the enable voltage VEN1=VEN2=Vcc.

The values of the circuit current at the time of standby ISTB are the typical of about 0 μA and the maximum of about 10 μA, for example (VEN1=VEN2=0V).

The values of the circuit current at the time of active operation Icc are the typical of about 50 μA and the maximum of about 80 μA, for example.

The values of the enable low voltage VENL are the typical of GND and the maximum of about 0.3 V, for example (standby mode).

The values of the enable high voltage VENH are the minimum of about 0.95 V and the typical level of about Vcc, for example (active mode).

The values of enable inflow current IEN are the typical level of about 1 μA and the maximum of about 10 μA, for example (VEN1=VEN2=2V).

The values of the operating frequency Fosc are the minimum of about 1.6 MHz, the typical of about 2 MHz, and the maximum of about 2.4 MHz, for example.

The values of the on resistance Ronp1 of p-channel MOSFET1 are the typical of about 0.6 Ω and the maximum of about 1.2 Ω, for example (Vcc=3.3 V). Similarly, the values of the on resistance Ronp2 of p-channel MOSFET2 are also the typical of about 0.6 Ω and the maximum of about 1.2 Ω, for example (Vcc=3.3 V).

The values of the on resistance Ronn1 of n-channel MOSFET1 are the typical of about 0.5 Ω and the maximum of about 1.0 Ω, for example (Vcc=3.3 V). Similarly, the values of the on resistance Ronn2 of n-channel MOSFET2 are also the typical of about 0.5 Ω and the maximum of about 1.0 Ω, for example (Vcc=3.3 V).

The values of the output voltage VOUT1 are the minimum of about 1.182 V, the typical level of about 1.2 V and the maximum of about 1.218 V (±1.5%).

The values of the output voltage VOUT2 are the minimum of about 1.773V, the typical level of about 1.8 V and the maximum of about 1.827 V (±1.5%).

The values of the UVLO detecting voltage VUVLO1 are the minimum of about 2.0 V, the typical of about 2.1V and the maximum of 2.2 V (Vcc=3.3V→0V).

The values of the UVLO release voltage VUVLO2 are the minimum of about 2.02 V, the typical of about 2.15V and the maximum of 2.3 V (Vcc=0V→3.3V).

The values of the soft start time Tss are the minimum of about 0.1 ms, typical of about 0.2 ms, and the maximum of about 0.4 ms, for example.

The values of the timer latch time $T_{LATCH}$ are the minimum of about 0.25 ms, the typical of about 0.5 ms, and the maximum of about 1 ms, for example (output short circuit detection (SCP)/TSD operational mode).

The values of the output short circuit detecting voltage Vscp1 are the standard of about 0.6 V and the maximum of about 0.84 V (VOUT1=1.2V→0V).

The values of the output short circuit detecting voltage Vscp2 are the standard of about 0.9 V and the maximum of about 1.26 V (VOUT2=1.8V→0V).

The electrical characteristics of the prototype example 2 of the switching power supply according to the second embodiment are expressed as shown in FIG. 15. So far as there is no specification in particular, they are the ambient temperature Ta=25 degrees C., the power supply voltage Vcc=3.3 V, and the enable voltage VEN1=VEN2=Vcc.

As compared with the prototype example 1, it differs only from the value of output voltage VOUT2 and the value of output short circuit detecting voltage Vscp2.

The values of the output voltage VOUT2 is the minimum of about 1.822 V, the typical level of about 1.85 V and the maximum of about 1.878 V (±1.5%).

The values of the output short circuit detecting voltage Vscp2 are the standard of about 0.925 V and the maximum of about 1.295 V (VOUT2=1.8V→0V).

(Terminal Numbers and Terminal Name)

The relation between the terminal numbers and the terminal name of the switching power supply according to the second embodiment is expressed as shown in FIG. 16.

The terminal name of the terminal numbers A1 is GND. It functions as the source terminal of the GND terminal/n-channel MOSFET.

The terminal name of the terminal numbers A2 is SW2. It functions as the drain output terminal of p-channel MOSFET/n-channel MOSFET of the channel 2 of the switching power supply according to the second embodiment.

The terminal name of terminal numbers A3 is EN2. It functions as the enable terminal (High Active) of the channel 2 of the switching power supply according to the second embodiment.

The terminal name of terminal numbers A4 is VOUT2. It functions as the output voltage terminal of the channel 2 of the switching power supply according to the second embodiment.

The terminal name of the terminal numbers B1 is SW1. It functions as the drain output terminal of p-channel MOSFET/n-channel MOSFET of the channel 1 of the switching power supply according to the second embodiment.

The terminal name of the terminal numbers B2 is Vcc. It functions as the source terminal of the Vcc power source input terminal/p-channel MOSFET.

The terminal name of the terminal numbers B3 is EN1. It functions as the enable terminal (High Active) of the channel 1 of the switching power supply according to the second embodiment.

The terminal name of terminal numbers B4 is VOUT1. It functions as the output voltage terminal of the channel 1 of the switching power supply according to the second embodiment.

(Characteristic Data)

Figure 17:
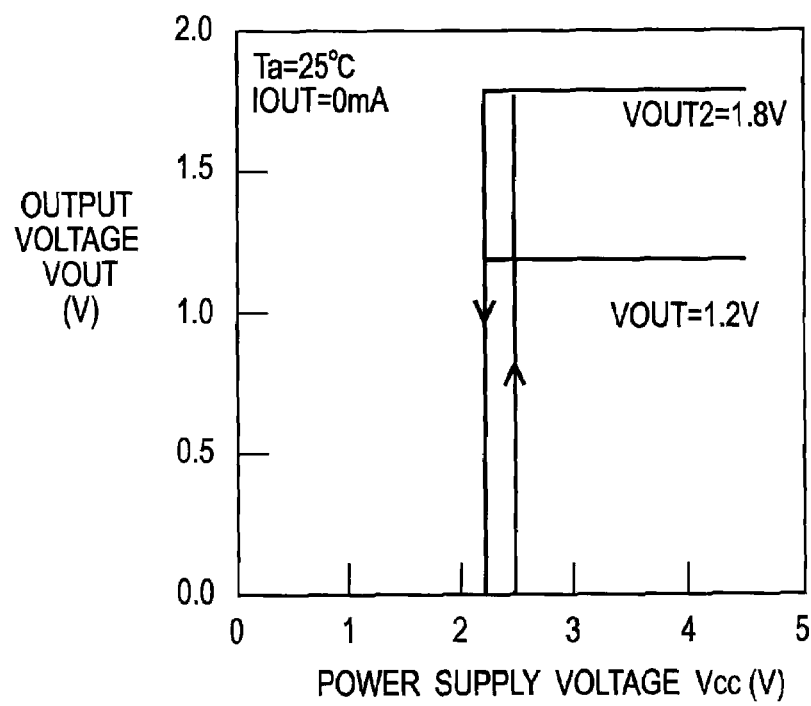
FIG. 17 shows characteristic data showing the relation between the output voltage VOUT and the power supply voltage Vcc of the switching power supply according to the second embodiment of the present invention.

In the switching power supply according to the second embodiment, at the time of the output current IOUT=0 mA and the ambient temperature Ta=25 degrees C., the relation between the output voltage VOUT and the power supply voltage Vcc is expressed as shown in FIG. 17. In the case where the value of the power supply voltage Vcc is a range which is about 2.3 to 4.5 V, for example, as for the value of the output voltage VOUT1/VOUT2, about 1.2 V/1.8 V is obtained, for example.

Figure 18:
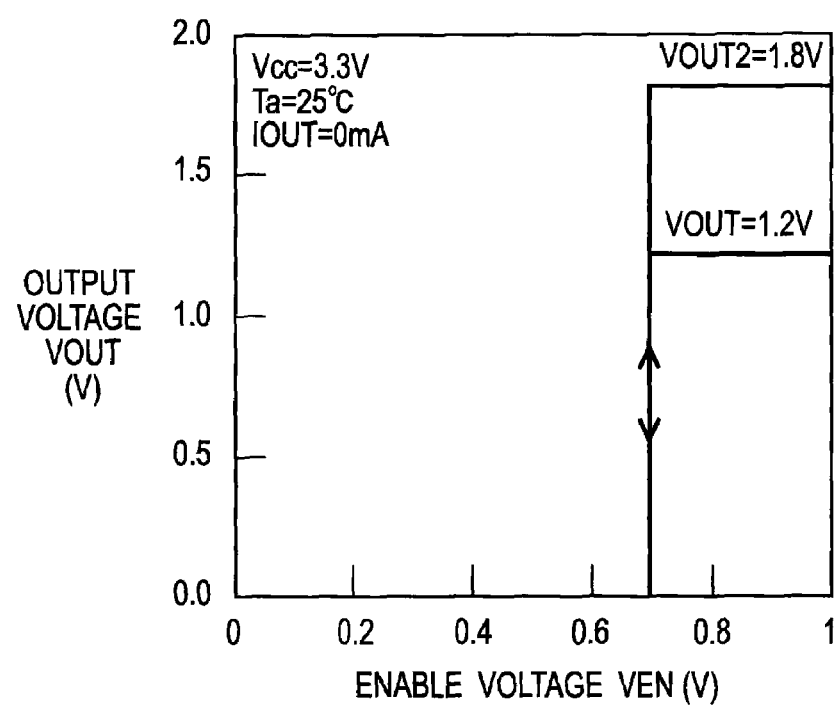
FIG. 18 shows characteristic data showing the relation between the output voltage VOUT and the enable voltage VEN of the switching power supply according to the second embodiment of the present invention.

In the switching power supply according to the second embodiment, at the time of the output current IOUT=0 mA, the relation between the output voltage VOUT and the enable voltage VEN is expressed as shown in FIG. 18. It is Vcc=3.3 V and is the ambient temperature Ta=25 degrees C. In the case where the value of the enable voltage VEN1 is a range which is about 0.7 to +1 V, for example, as for the value of the output voltage VOUT1/VOUT2, about 1.2 V/1.8 V is obtained, for example.

Figure 19:
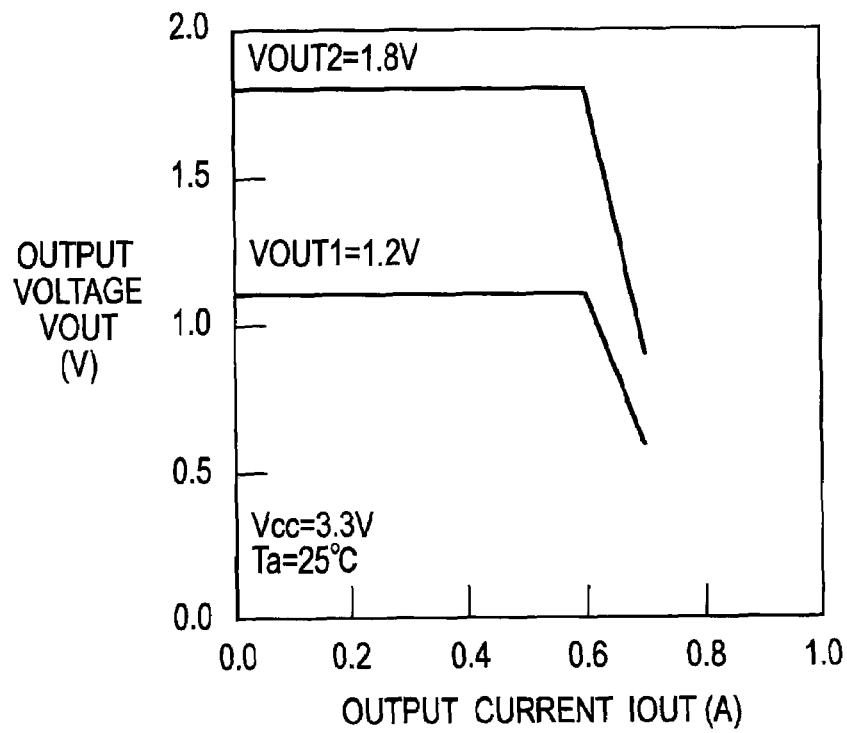
FIG. 19 shows characteristic data showing the relation between the output voltage VOUT and the output current IOUT of the switching power supply according to the second embodiment of the present invention.

In the switching power supply according to the second embodiment, at the time of Vcc=3.3 V and the ambient temperature Ta=25 degrees C., the relation between the output voltage VOUT and the output current IOUT is expressed as shown in FIG. 19. In the case where the value of the output current IOUT is a wide range which is about 0 to 0.6 V, for example, as for the value of the output voltage VOUT1/VOUT2, about 1.2 V/1.8 V is obtained, for example. Since the value of the output current IOUT corresponds to the value of the load current and it can operate in the wide range of about 0 to 0.6 A, it proves that the switching power supply according to the second embodiment can correspond with a wide value even in the variation range of the load.

Figure 20:
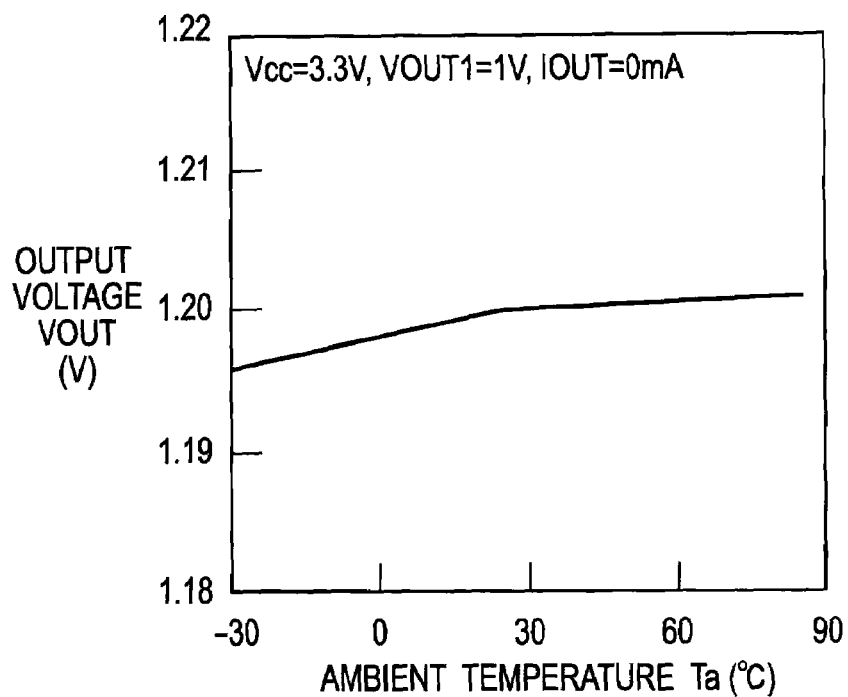
FIG. 20 shows characteristic data showing the relation between the output voltage VOUT1 and the ambient temperature Ta of the switching power supply according to the second embodiment of the present invention.

In the switching power supply according to the second embodiment, at the time of 1=0 mA of the output current IOUT, the relation between the output voltage VOUT1 and the ambient temperature Ta is expressed as shown in FIG. 20. It is Vcc=3.3 V and is VOUT1=1 V. In the operational temperature range Topr, about −30 degrees C. to about +85 degrees C. is obtained, for example.

Figure 21:
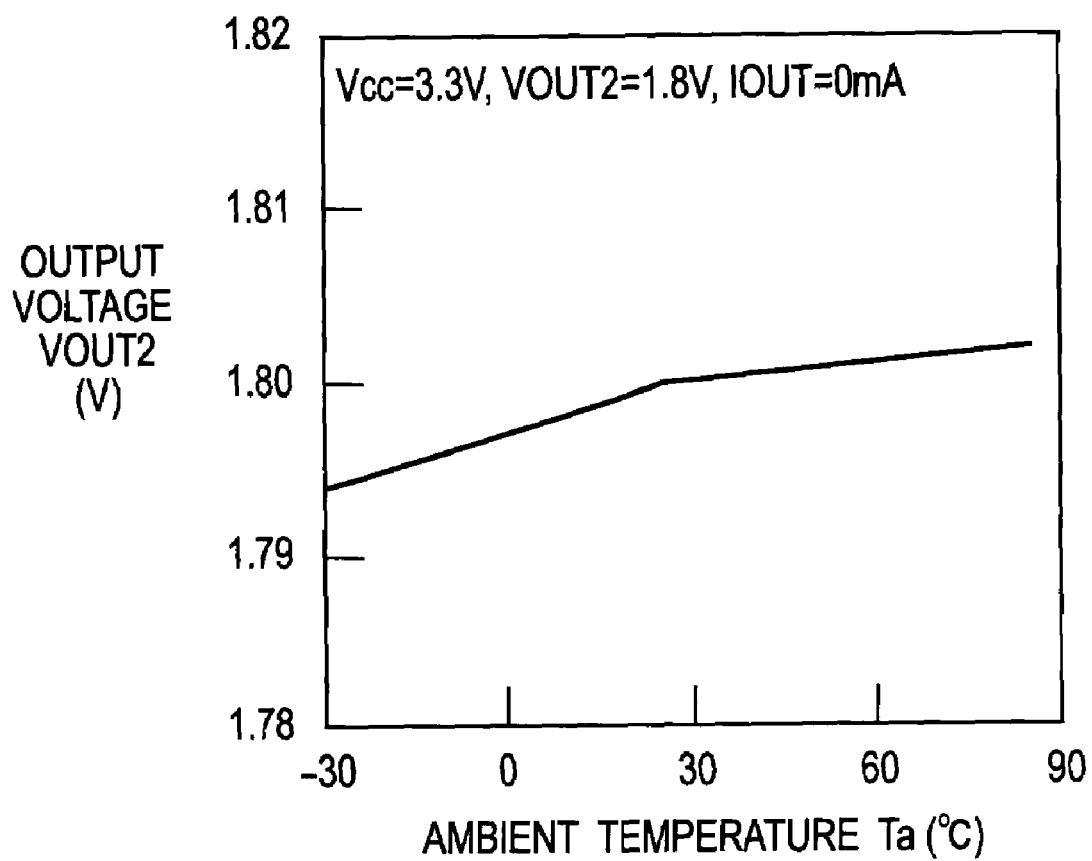
FIG. 21 shows characteristic data showing the relation between the output voltage VOUT2 and the ambient temperature Ta of switching power supply according to the second embodiment of the present invention.

In the switching power supply according to the second embodiment, at the time of 2=0 mA of the output current IOUT, the relation between the output voltage VOUT2 and the ambient temperature Ta is expressed as shown in FIG. 21. It is Vcc=3.3 V and is VOUT2=1 V. In the operational temperature range Topr, about −30 degrees C. to about +85 degrees C. is obtained, for example.

Figure 22:
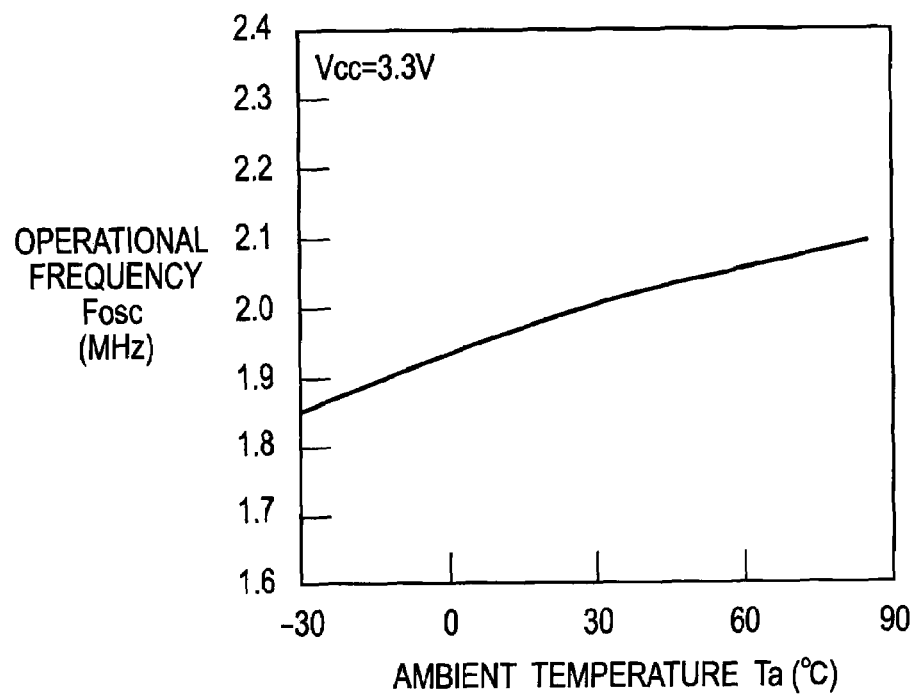
FIG. 22 shows characteristic data showing the relation between the operating frequency Fosc and the ambient temperature Ta of the switching power supply according to the second embodiment of the present invention.

In the switching power supply according to the second embodiment, at the time of Vcc=3.3 V, the relation between the operating frequency Fosc and the ambient temperature Ta is expressed as shown in FIG. 22. The operating frequency Fosc is included in the range of about 1.85 MHz to about 2.1 MHz, in the range of the ambient temperature Ta=−30 degrees C. to +85 degrees C.

Figure 23:
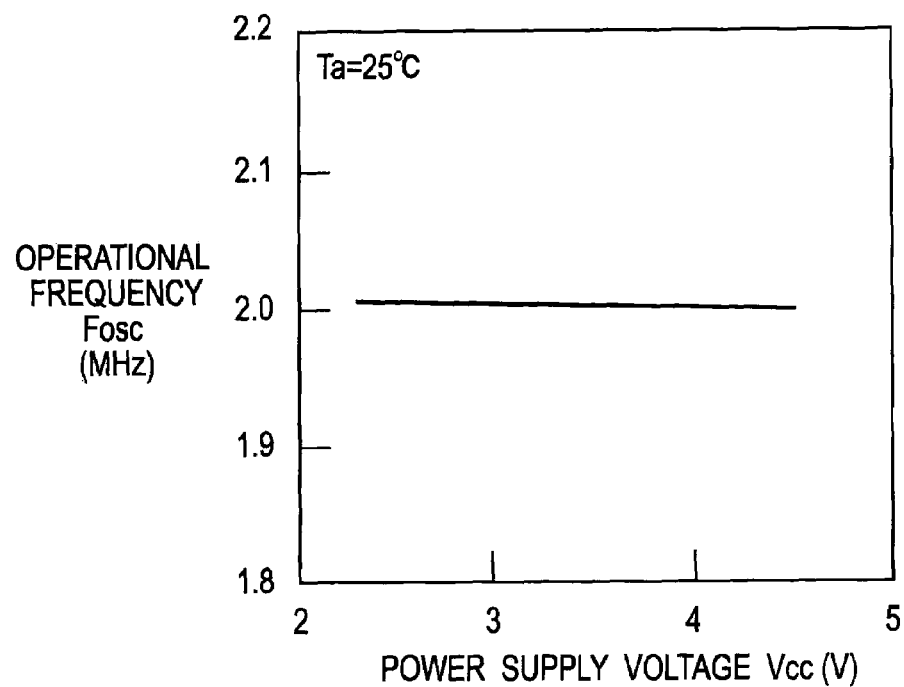
FIG. 23 shows characteristic data showing the relation between the operating frequency Fosc and the power supply voltage Vcc of the switching power supply according to the second embodiment of the present invention.

In the switching power supply according to the second embodiment, at the time of Ta=25 degrees C., the relation between the operating frequency Fosc and the power supply voltage Vcc is expressed as shown in FIG. 23. In the wide range of the power supply voltage Vcc=2.3 V to 4.5 V, the value of the operating frequency Fosc indicates constant value by 2 MHz substantially.

Figure 24:
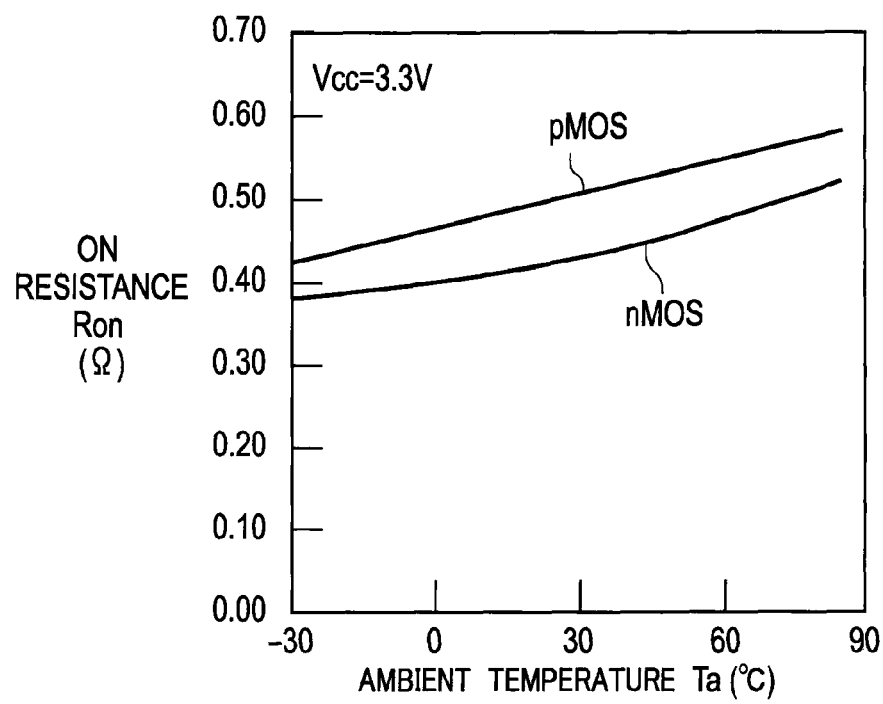
FIG. 24 shows characteristic data showing the relation between the on resistance Ronn1 of n-channel MOSFET and the on resistance Ronp1 of p-channel MOSFET, and the ambient temperature Ta of the switching power supply according to the second embodiment of the present invention.

In the switching power supply according to the second embodiment, at the time of Vcc=3.3 V, the relation between the on resistance Ronn1 of n-channel MOSFET and the on resistance Ronp1 of p-channel MOSFET, and the ambient temperature Ta is expressed as shown in FIG. 24. In the range of the ambient temperature Ta=−30 degrees C. to +85 degrees C., the value of the on resistance Ronn1 of n-channel MOSFET is included in the range of about 0.42 Ω to about 0.58 Ω, and the value of the on resistance Ronp1 of p-channel MOSFET is included in the range of about 0.38Ω to about 0.52 Ω.

Figure 25:
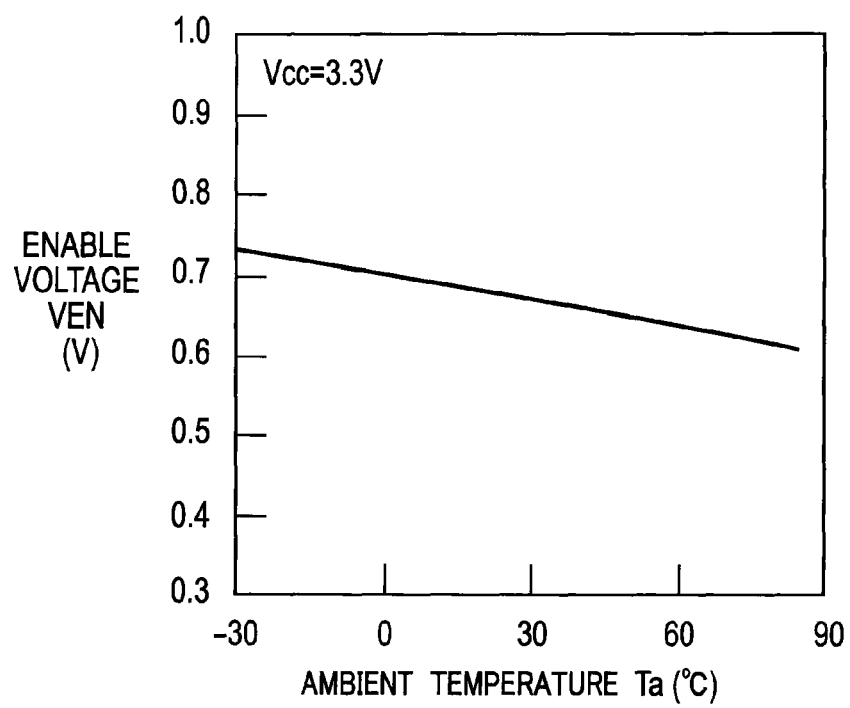
FIG. 25 shows characteristic data showing the relation between the enable voltage VEN and the ambient temperature Ta of the switching power supply according to the second embodiment of the present invention.

In the switching power supply according to the second embodiment, at the time of Vcc=3.3 V, the relation between the enable voltage VEN and the ambient temperature Ta is expressed as shown in FIG. 25. In the range of the ambient temperature Ta=−30 degrees C. to +85 degrees C., the value of the enable voltage VEN decreases linearly substantially, and is included in the range of about 0.72 V to about 0.61 V.

Figure 26:
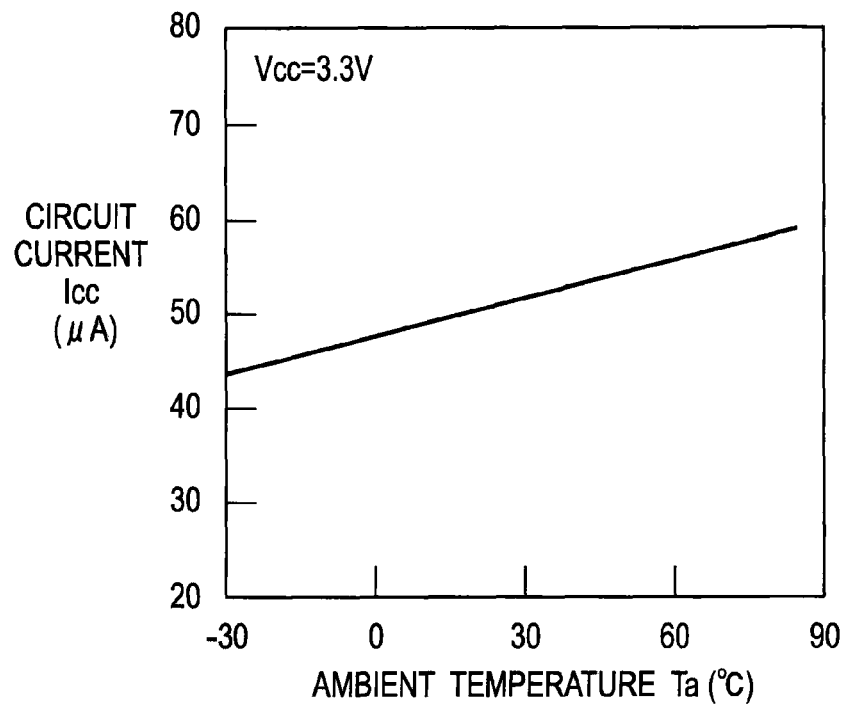
FIG. 26 shows characteristic data showing the relation between the circuit current at the time of active operation Icc and the ambient temperature Ta of the switching power supply according to the second embodiment of the present invention.

In the switching power supply according to the second embodiment, at the time of Vcc=3.3 V, the relation between the circuit current at the time of active operation Icc and the ambient temperature Ta is expressed as shown in FIG. 26. In the range of the ambient temperature Ta=−30 degrees C. to +85 degrees C., the circuit current at the time of active operation Icc rises linearly substantially, and is included in the range of about 44 μA to about 58 μA.

Figure 27:
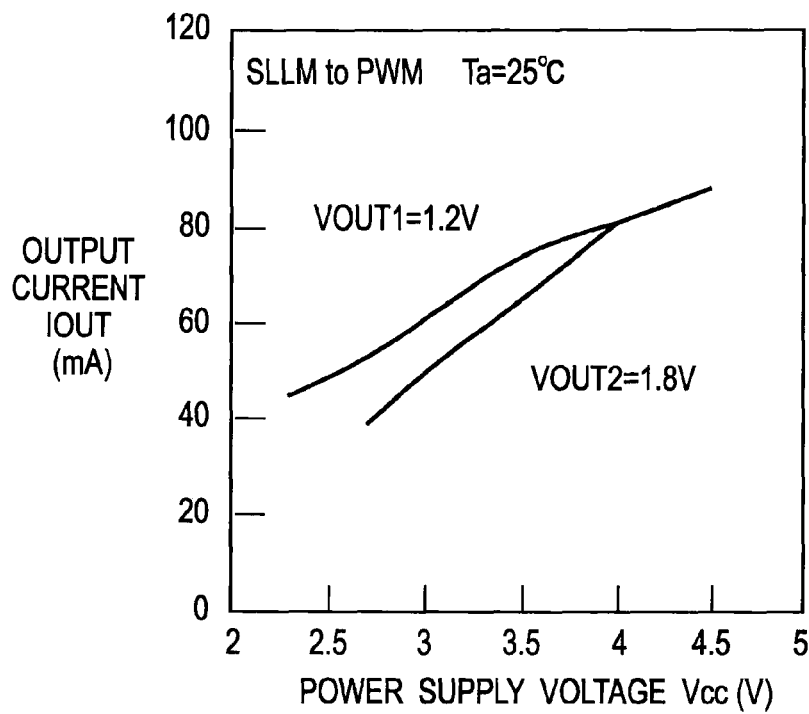
FIG. 27 shows characteristic data showing the relation between the output current IOUT and the power supply voltage Vcc of the switching power supply according to the second embodiment of the present invention, and is a figure showing PWM switching current value for the output voltages VOUT1 and VOUT2.

In the switching power supply according to the second embodiment, at the time of the ambient temperature Ta=25 degrees C., the relation between the output current IOUT and the power supply voltage Vcc on condition of the voltage VOUT1=1.2 V and the output voltage VOUT2=1.8 V is expressed as shown in FIG. 27. The switching current value from the SLLM control or the DSLLM control mode to the PWM control is shown for the output voltages VOUT1 and VOUT2.

Figure 28:
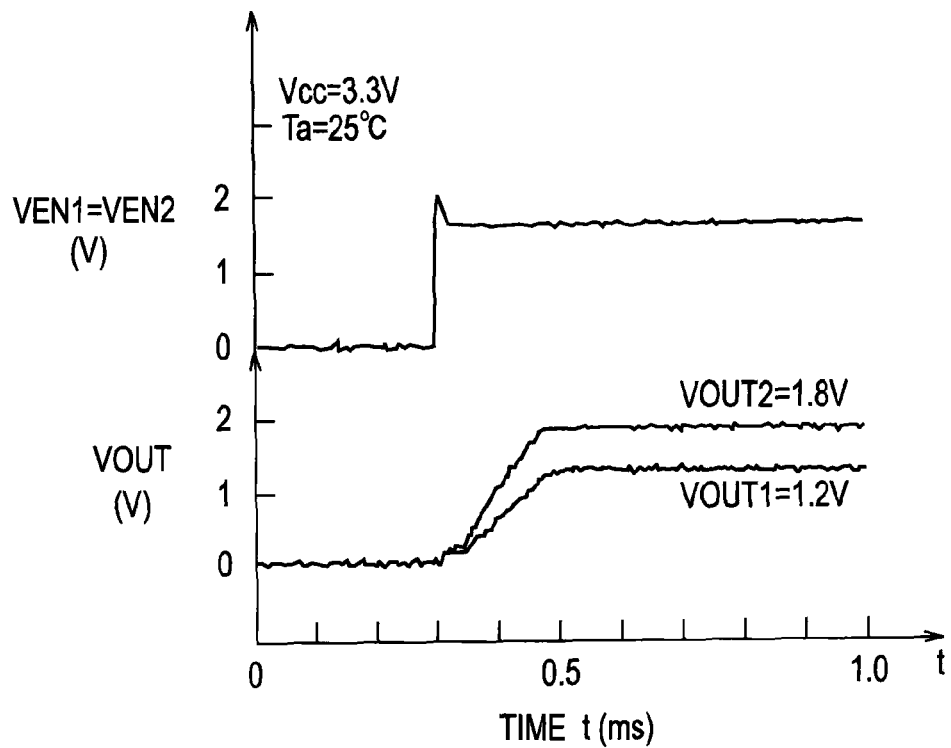
FIG. 28 is a figure showing a soft start waveform of the output voltages VOUT1 and VOUT2 for an enable voltage (VEN1=VEN2) waveform at the time of the output current IOUT=0 mA, in the switching power supply according to the second embodiment of the present invention.

In the switching power supply according to the second embodiment, at the time of Vcc=3.3 V, the ambient temperature Ta=25 degrees C., and the output current IOUT=0 mA, the soft start waveform of the output voltages (VOUT1, VOUT2) for the enable voltage (VEN1=VEN2) waveform is expressed as shown in FIG. 28. The soft start time Tss defined by the rise time of output voltages (VOUT1, VOUT2) is about 0.1 to about 0.15 microsecond in any of VOUT1=1.2 V and VOUT2=1.8 V.

Figure 29:
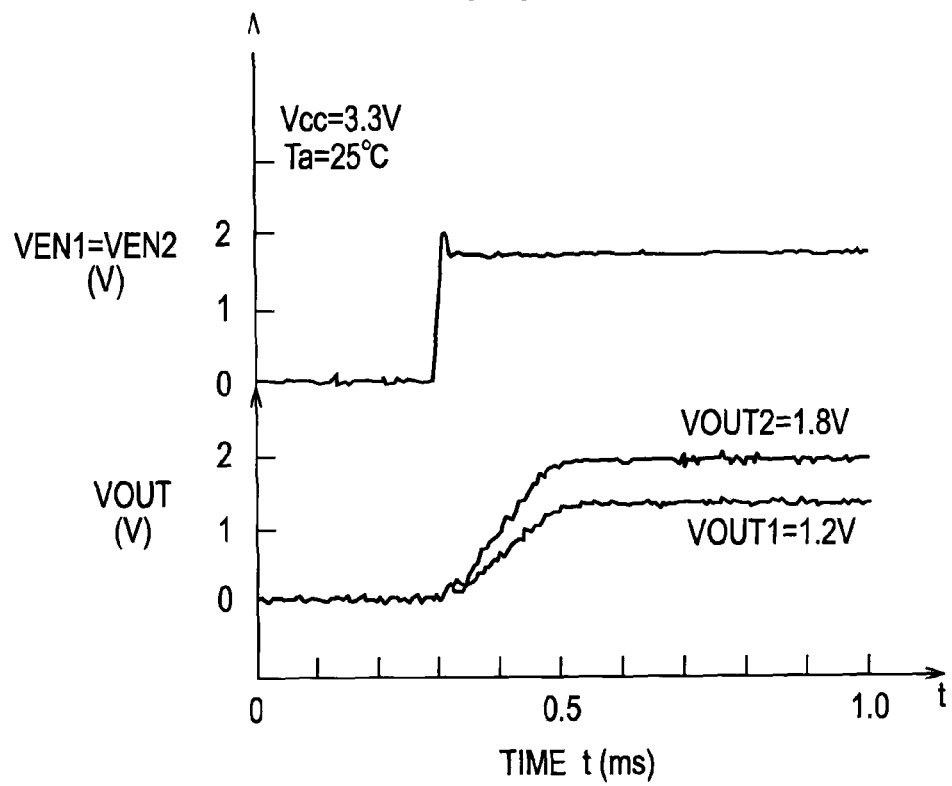
FIG. 29 is a figure showing a soft start waveform of the output voltages VOUT1 and VOUT2 for an enable voltage (VEN1=VEN2) waveform at the time of the output current IOUT=300 mA, in the switching power supply according to the second embodiment of the present invention.

In the switching power supply according to the second embodiment, at the time of Vcc=3.3 V, the ambient temperature Ta=25 degrees C., and the output current IOUT=300 mA, the soft start waveform of the output voltages (VOUT1, VOUT2) for the enable voltage (VEN1=VEN2) waveform is expressed as shown in FIG. 29. The soft start time Tss is about 0.1 to about 0.15 microsecond in any of VOUT1=1.2 V and VOUT2=1.8 V.

Figure 30:
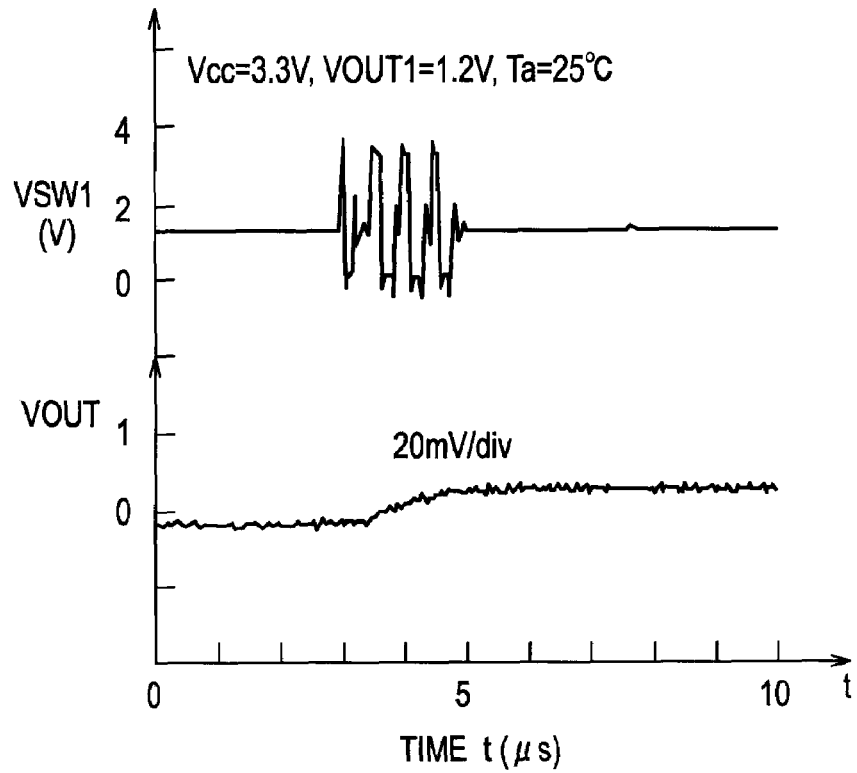
FIG. 30 is a figure showing a waveform of the output voltage VOUT1 for an SW voltage VSW1 waveform at the time of the output current IOUT=0 mA, in the switching power supply according to the second embodiment of the present invention.

In the switching power supply according to the second embodiment, at the time of the output current IOUT=0 mA, the waveform of the output voltage VOUT1 for the waveform of the voltage VSW1 of SW1 terminal is expressed as shown in FIG. 30. In this case, it is Vcc=3.3 V, is VOUT1=1.2 V, and is the ambient temperature Ta=25 degrees C. The vertical axis of the output voltage VOUT1 is 20 mV/diV.

Figure 31:
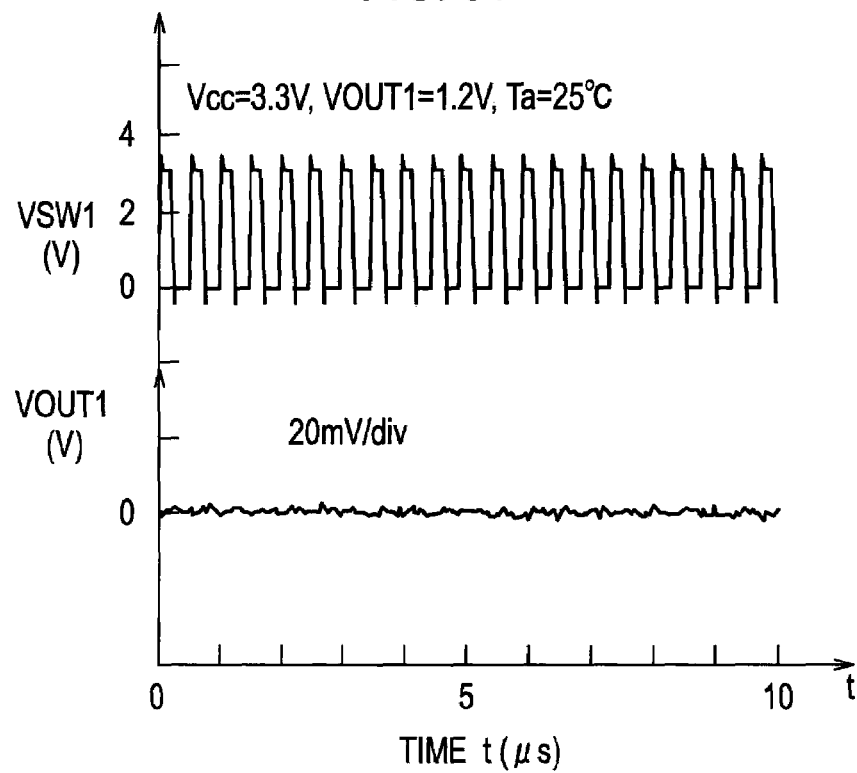
FIG. 31 is a figure showing a waveform of the output voltage VOUT1 for an SW voltage VSW1 waveform at the time of the output current IOUT=300 mA, in the switching power supply according to the second embodiment of the present invention.

In the switching power supply according to the second embodiment, at the time of the output current IOUT=300 mA, the waveform of the output voltage VOUT1 for the waveform of the voltage VSW1 of SW1 terminal is expressed as shown in FIG. 31. In this case, it is Vcc=3.3 V, is VOUT1=1.2 V, and is the ambient temperature Ta=25 degrees C. The vertical axis of the output voltage VOUT1 is 20 mV/diV.

Figure 32:
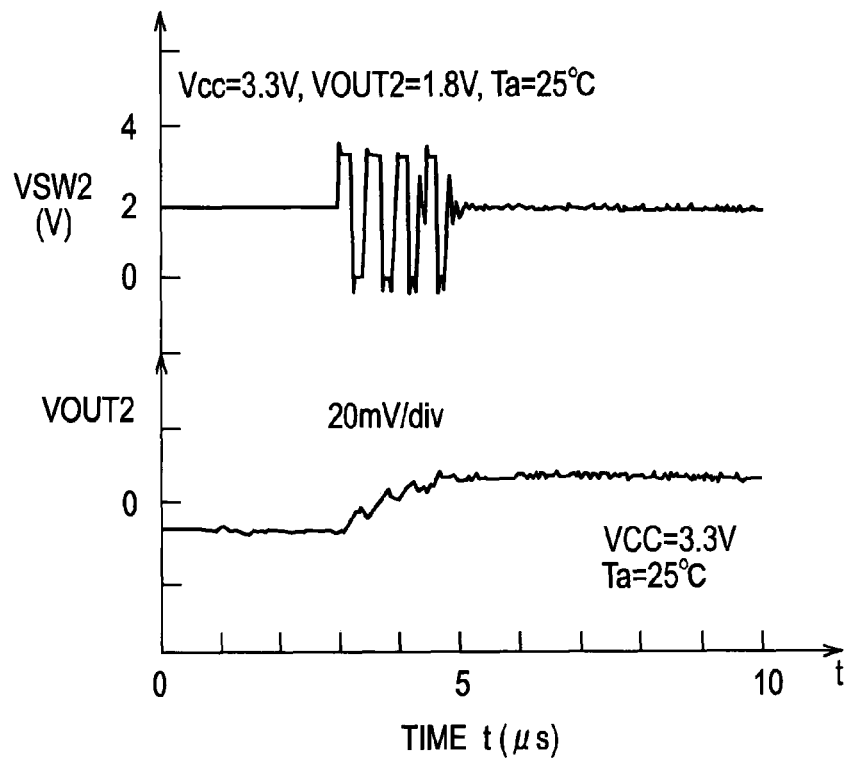
FIG. 32 is a figure showing a waveform of the output voltage VOUT2 for an SW voltage VSW2 waveform at the time of the output current IOUT=0 mA, in the switching power supply according to the second embodiment of the present invention.

In the switching power supply according to the second embodiment, at the time of the output current IOUT=0 mA, the waveform of the output voltage VOUT2 for the waveform of the voltage VSW2 of SW2 terminal is expressed as shown in FIG. 32. In this case, it is Vcc=3.3 V, is VOUT2=1.8 V, and is the ambient temperature Ta=25 degrees C. The vertical axis of the output voltage VOUT2 is 20 mV/diV.

Figure 33:
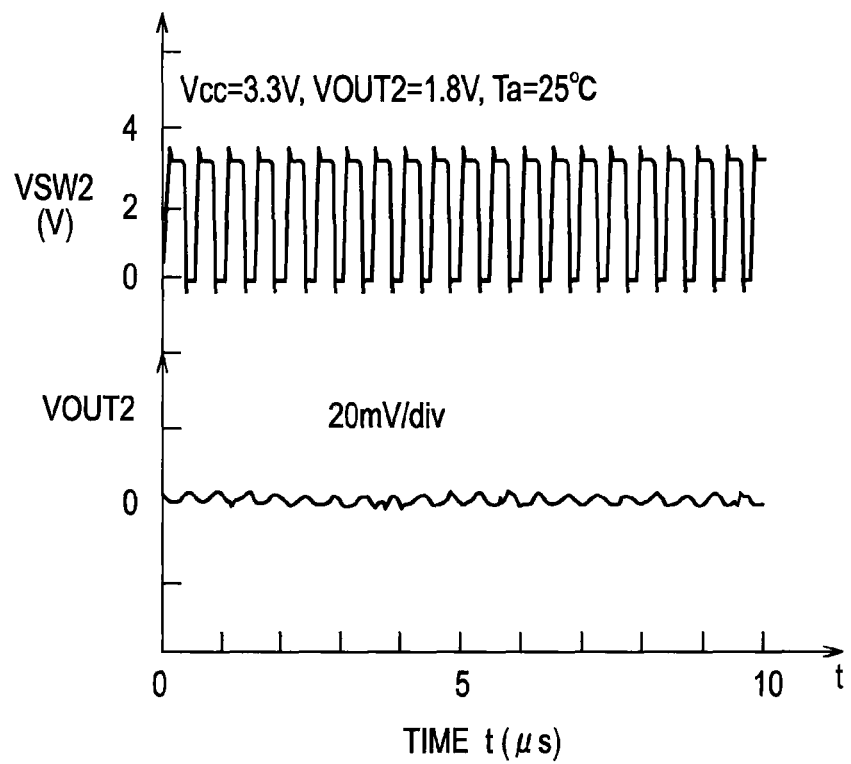
FIG. 33 is a figure showing a waveform of the output voltage VOUT2 for an SW voltage VSW2 waveform at the time of the output current IOUT=300 mA, in the switching power supply according to the second embodiment of the present invention.

In the switching power supply according to the second embodiment, at the time of the output current IOUT=300 mA, the waveform of the output voltage VOUT2 for the waveform of the voltage VSW2 of SW2 terminal is expressed as shown in FIG. 33. In this case, it is Vcc=3.3 V, is VOUT2=1.8 V, and is the ambient temperature Ta=25 degrees C. The vertical axis of the output voltage VOUT2 is 20 mV/diV.

Figure 34:
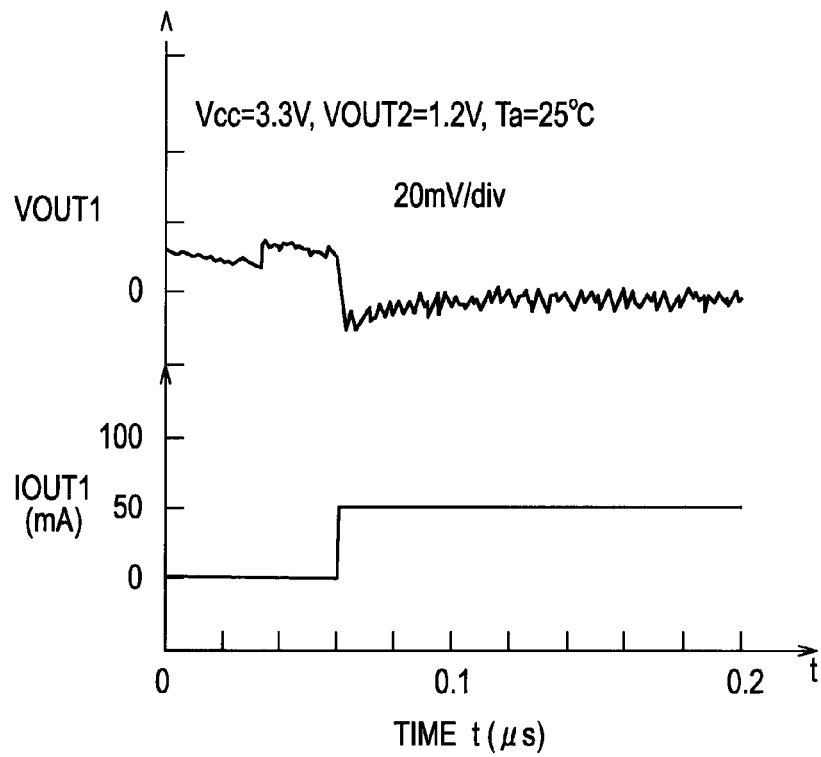
FIG. 34 is a figure showing a load response waveform of the output voltage VOUT1 when the output current IOUT1 rises in 1→50 mA/microsecond rising, in the switching power supply according to the second embodiment of the present invention.

In the switching power supply according to the second embodiment, the load response waveform of the output voltage VOUT1 when the output current IOUT1 rises in 1→50 mA/microsecond rising is expressed as shown in FIG. 34. In this case, it is Vcc=3.3 V, is VOUT1=1.2 V, and is the ambient temperature Ta=25 degrees C. The vertical axis of the output voltage VOUT1 is 20 mV/diV.

Figure 35:
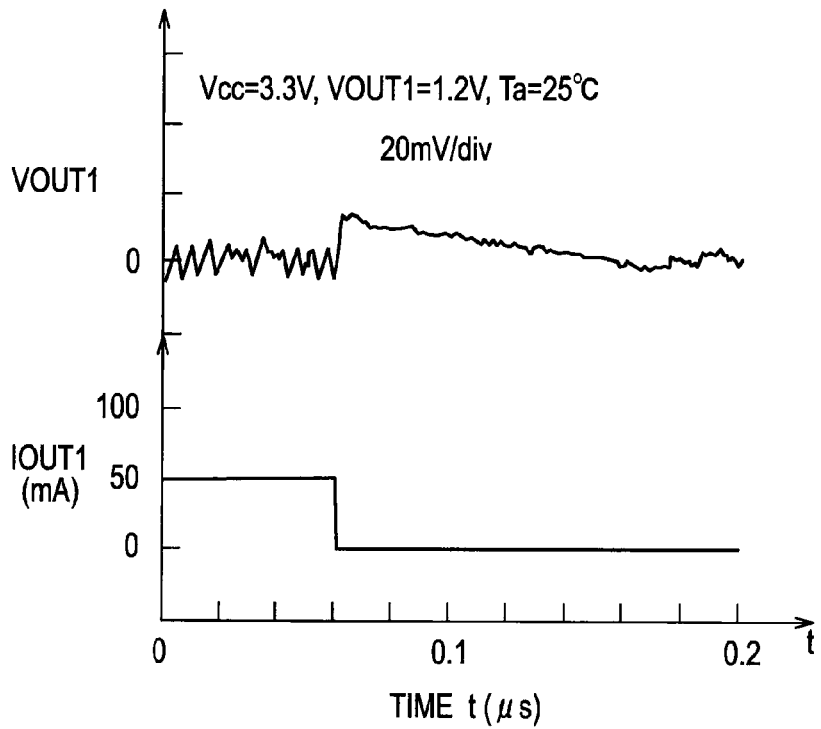
FIG. 35 is a figure showing a load response waveform of the output voltage VOUT1 when the output current IOUT1 drops in 1→50 mA/microsecond falling, in the switching power supply according to the second embodiment of the present invention.

In the switching power supply according to the second embodiment, the load response waveform of the output voltage VOUT1 when the output current IOUT1 drops in 50→1 mA/microsecond falling is expressed as shown in FIG. 35. In this case, it is Vcc=3.3 V, is VOUT1=1.2 V, and is the ambient temperature Ta=25 degrees C. The vertical axis of the output voltage VOUT1 is 20 mV/diV.

In the switching power supply according to the second embodiment, as shown in FIG. 34 and FIG. 35, it proves that the fast transient response characteristics is achieved by the current modal control method.

Figure 36:
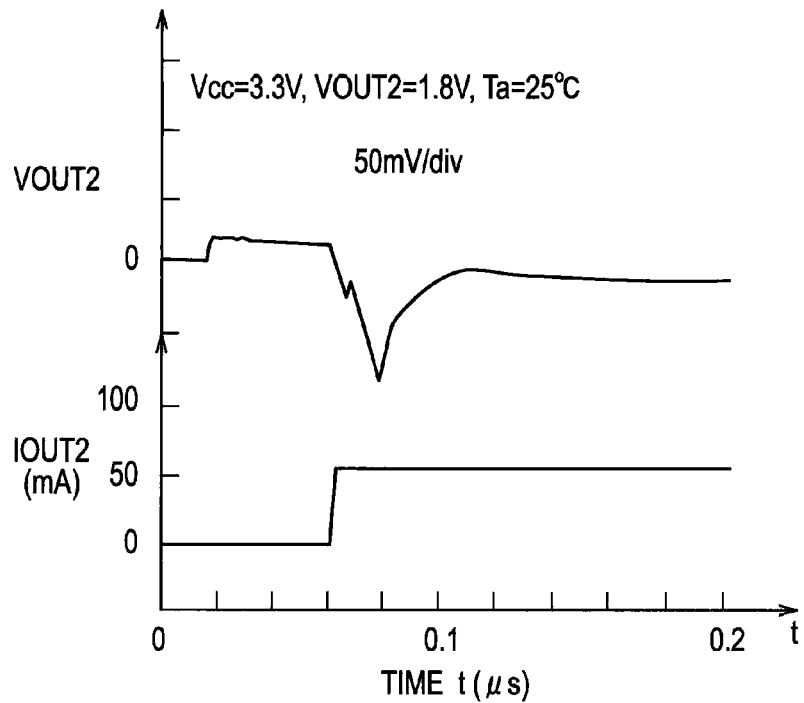
FIG. 36 is a figure showing a load response waveform of the output voltage VOUT2 when the output current IOUT2 rises in 1→50 mA/microsecond rising, in the switching power supply according to the second embodiment of the present invention.

In the switching power supply according to the second embodiment, the load response waveform of the output voltage VOUT2 when the output current IOUT2 rises in 1→50 mA/microsecond rising is expressed as shown in FIG. 36. In this case, it is Vcc=3.3 V, is VOUT2=1.8 V, and is the ambient temperature Ta=25 degrees C. The vertical axis of the output voltage VOUT2 is 50 mV/diV.

Figure 37:
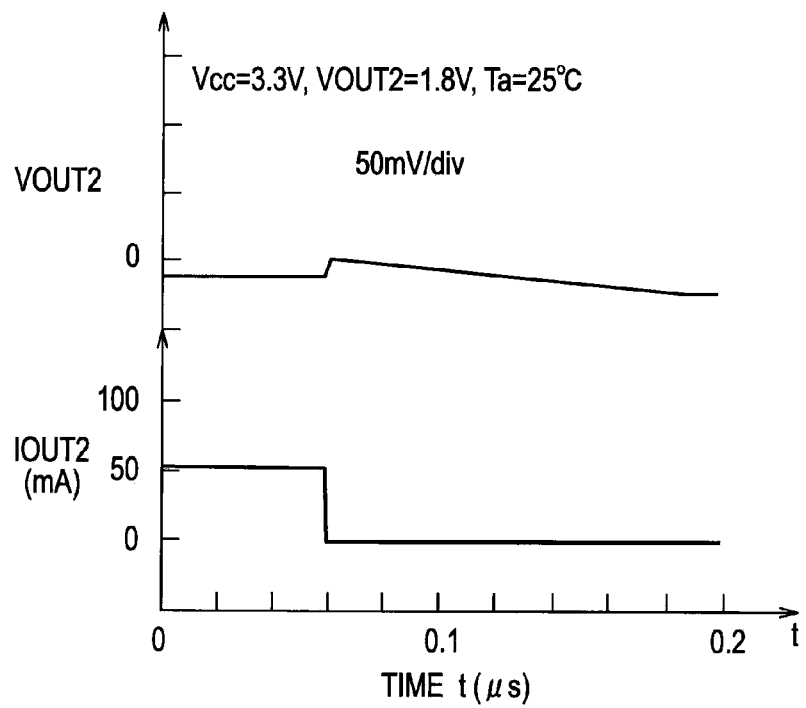
FIG. 37 is a figure showing a load response waveform of the output voltage VOUT2 when the output current IOUT2 drops in 50→1 mA/microsecond falling, in the switching power supply according to the second embodiment of the present invention.

In the switching power supply according to the second embodiment, the load response waveform of the output voltage VOUT2 when the output current IOUT2 drops in 50→1 mA/microsecond falling is expressed as shown in FIG. 37. In this case, it is Vcc=3.3 V, is VOUT2=1.8 V, and is the ambient temperature Ta=25 degrees C. The vertical axis of the output voltage VOUT2 is 50 mV/diV.

Figure 38:
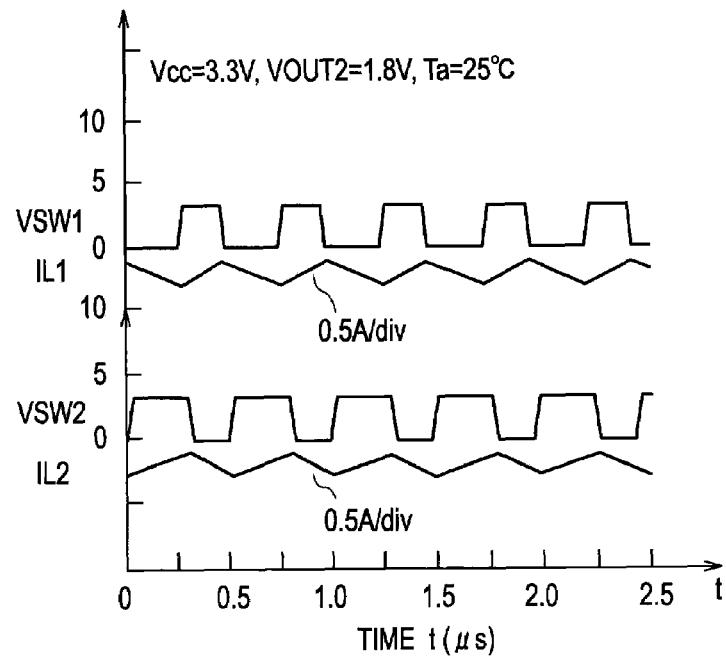
FIG. 38 is a normal operation wave form chart of the SW voltage VSW1 waveform and the load current IL1 waveform, the SW voltage VSW2 waveform and the load current IL2 waveform, at the time of the output current IOUT1=300 mA and the output current IOUT2=300 mA, in the switching power supply according to the second embodiment of the present invention.

In the switching power supply according to the second embodiment, at the time of IOUT1=300 mA and IOUT2=300 mA of the output current, the normal operation waveforms of the SW voltage VSW1 and the load current IL1, and the SW voltage VSW2 and the load current IL2 are expressed as shown in FIG. 38. Both of vertical axes of the load current IL1 and the load current IL2 is 0.5 A/diV.

(WL-CSP Technology)

Figure 39:
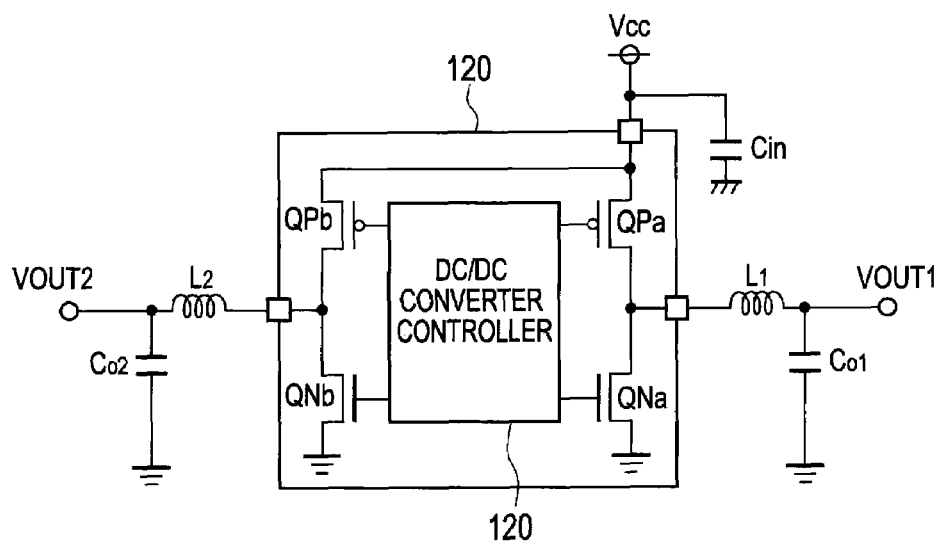
FIG. 39 is a schematic circuit configuration chart showing an example of application mounting, in the switching power supply according to the second embodiment of the present invention.

In the switching power supply according to the second embodiment, a schematic circuit configuration showing an example of application mounting is expressed as shown in FIG. 39.

The miniaturization of the example of application mounting is achieved by adopting the WL-CSP, which built the power MOSFET in the compact package. That is, the ceramic condenser is applied as the output capacitors Co1 and Co2 by the current modal control. The value of Co1=Co2 is about 10 μF, for example. By the operating frequency of 2 MHz, the value of the externally connected coils L1 and L2 is about 2.2 μH, for example. Accordingly, the packaging areas are reducible.

(Operation Explanation of Each Block)

Figure 40:
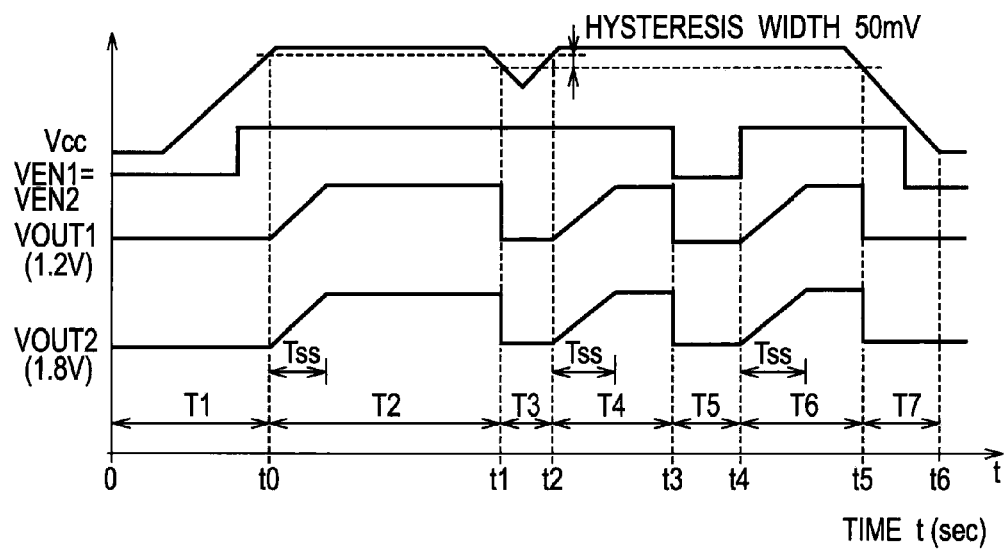
FIG. 40 is a timing chart for explaining a shutdown operation, a soft start operation, and a UVLO operation, in the switching power supply according to the second embodiment of the present invention.

In the switching power supply according to the second embodiment, a timing chart for explaining the shutdown operation, the soft start operation, and the UVLO operation is expressed as shown in FIG. 40. Each operation timing waveform of the power supply voltage Vcc, the enable voltage VEN1=VEN2, and the output voltages VOUT1 and VOUT2 is shown in FIG. 40.

-Shutdown Function-

The EN terminal is provided in each channel, and the EN terminal control independent, respectively is possible. All the circuits are turned OFF because the EN terminal is turned to the low (<0.3V) and each channel becomes the standby mode (ISTB=0 μA Typ.), and each channel becomes the operational mode because the EN terminal is turned to the high (>0.95V).

-Soft Start Function-

At the time of EN powering on, the soft start function functions, and the output voltage VOUT rises gently applying limitation to the current at a start-up. Accordingly, the overshoot and the rush current of output voltage can be prevented.

-UVLO Function-

It is detected whether the power supply voltage Vcc which can secure the output voltage VOUT of the switching power supply according to the second embodiment is supplied. Moreover, in order to prevent chattering of the output, the hysteresis width of about 50 mV (Typ.) is provided in the detecting voltage, for example.

(a) During the period T1 of time 0 to t0, the power supply voltage Vcc is turned ON and expresses the period which rises gradually. In the time t0, the malfunctions prevention voltage at the time of low input voltages VUVLO1 and VUVLO2 are detected.

(b) During the period T2 of the time t0 to t1, the output voltages VOUT1 and VOUT2 performs the soft start, and expresses the period which rises to the high level. Tss expresses the soft start time.

(c) During the period T3 of the time t1 to t2 expresses the period when the power supply voltage Vcc reduced temporarily. In this period, the output voltages VOUT1 and VOUT2 is turned to the low level. In the time t1 and t2, the malfunctions prevention voltage at the time of low input voltages VUVLO1 and VUVLO2 are detected.

(d) During the period T4 of the time t2 to t3, the output voltages VOUT1 and VOUT2 performs the soft start again, and expresses the period which rises to the high level.

(e) During the period T5 of the time t3 to t4 expresses the period when the enable voltage VEN1=VEN2 is temporarily turned to the low level. In this period, the output voltages VOUT1 and VOUT2 is turned to the low level.

(f) During the period T6 of the time t4 to t5, the output voltages VOUT1 and VOUT2 performs the soft start again, and expresses the period which rises to the high level. In the time t5, the output short circuit detecting voltages VUVLO1 and VUVLO2 are detected.

(g) During the period T7 of the time t5 to t6 expresses the period when the enable voltage VEN1=VEN2 is temporarily turned to the low level. In this period, the output voltages VOUT1 and VOUT2 is turned to the low level.

As mentioned above, during the periods T1, T3, T5, and T7 is in the output OFF state, and during the periods T2, T4, and T6 is in the output operation mode state.

(Timer Latch Type Short Protection Function)

Figure 41:
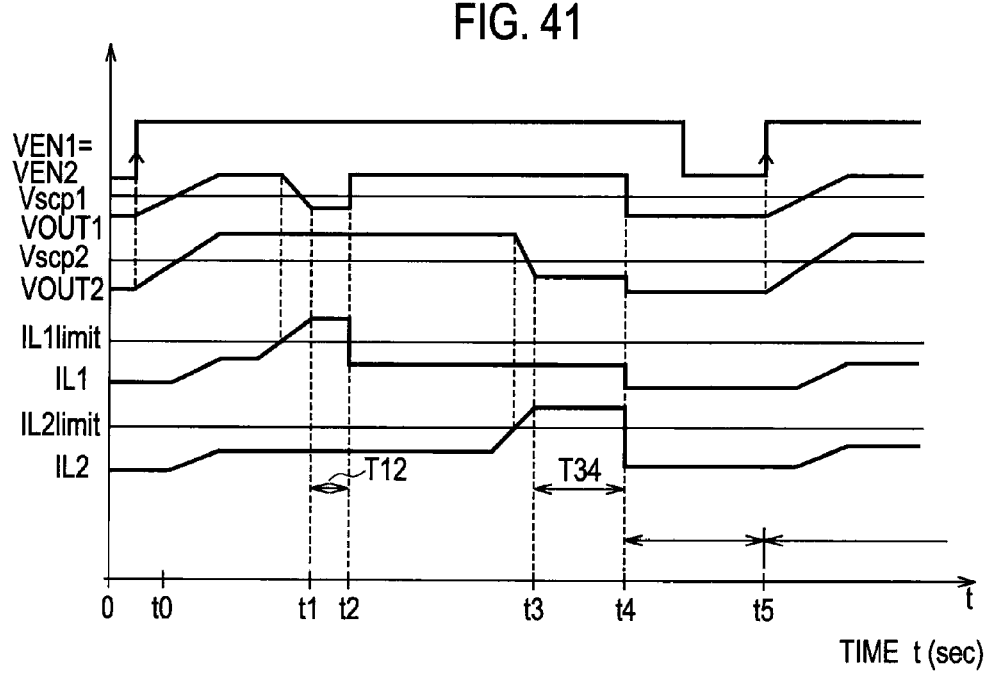
FIG. 41 is a timing chart for explaining a timer latch short protecting operation, in the switching power supply according to the second embodiment of the present invention.

In the switching power supply according to the second embodiment, a timing chart for explaining the timer latch type short protected operation is expressed as shown in FIG. 41. Each operation timing waveform of the enable voltage VEN1=VEN2, the output voltages VOUT1 and VOUT2, and the coil currents IL1 and IL2 is shown in FIG. 41. Each level of the output short circuit detecting voltages Vscp1 and Vscp2 corresponding to each of the output voltages VOUT1 and VOUT2 is further shown in FIG. 41. Moreover, each level of the over current detection values IL1limit and IL2limit corresponding to each the coil currents IL1 and IL2 is also shown in FIG. 41.

The over current protection circuit is built in the output and the current limiting is performed. Furthermore, when one of the channels detects a load short mode etc. by the output short circuit protection circuit and the protection circuit performs a continuous action beyond fixed time, the output latches both channels by OFF state, and prevents the breakdown of the switching power supply. The output voltage restores by turning ON the enable voltage VEN again or canceling the VUVLO again.

In FIG. 41, it is in output OFF state during the period of the time 0 to t0, and the period of the time t4 to t5, and is in the outputting operation mode state during the period of the time t0 to t4 and the period of the time t5 or later. In the time t4, both the output voltages VOUT1 and VOUT2 are in output OFF state, and the timer latch operation is performed. The period T34 of the time t3 to t4 is equal to the timer latch time $T_{Latch}$. On the other hand, the period T12 of the time t1 to t2 is smaller than the timer latch time $T_{Latch}$.

(Efficiency of Switching Power Supply)

The efficiency η of the switching power supply according to the second embodiment can be expressed such as a following formula:

$$\eta = \{VOUT \times IOUT / (Vin \times Iin)\} \times 100(\%) \quad (1)$$
$$= (POUT/Pin) \times 100(\%)$$
$$= \{POUT/(POUT+PD\alpha)\} \times 100(\%).$$

The following can be enumerated as a factor of loss PDα of the switching power supply of the second embodiment. The efficiency can be improved by reducing these.

The factor of loss PDα can be summarized to the following (a) to (e).

(a) Conduction power loss: PD ($I^2R$) by the on resistance of the coil L, n-channel MOSFET, and p-channel MOSFET.
(b) Gate charging up and discharging power loss: PD (Gate).
(c) Switching power loss: PD (SW).
(d) Equivalent series resistance (ESR) loss of the capacitor: PD (ESR).
(e) Operating current loss of the switching power supply: PD (IC).

PD ($I^2R$) is expressed by a following formula:

$$PD(I^2R) = IOUT2 \times (RCOIL \times RON) \quad (2)$$

where RCOIL (Ω) denotes the direct current (DC) resistance of the coil L, RON (Ω) denotes the on resistance of MOSFET, and IOUT (A) denotes the output current.

PD (Gate) is expressed by a following formula:

$$PD(Gate) = Cgs \times f \times V \quad (3)$$

where Cgs (F) denotes the gate capacitance of MOSFET, f (Hz) denotes the switching frequency, and V(V) denotes the gate driver voltage of MOSFET.

PD (SW) is expressed by a following formula:

$$PD(SW) = Vin^2 \times CRSS \times IOUT \times f/IDRIVE \quad (4)$$

where CRSS (F) denotes the reciprocal transmission capacity of MOSFET, and IDRIVE (A) denotes the peak current of the gate.

PD (ESR) is expressed by a following formula:

$$PD(ESR) = IRMS^2 \times ESR \quad (5)$$

where IRMS (A) denotes the ripple current of the capacitor and ESR (Ω) is the equivalent series resistance.

PD (IC) is expressed by a following formula:

$$PD(IC) = Vin \times Icc \quad (6)$$

where Icc (A) denotes the circuit current.

(Power Dissipation, Thermal Design)

Figure 42:
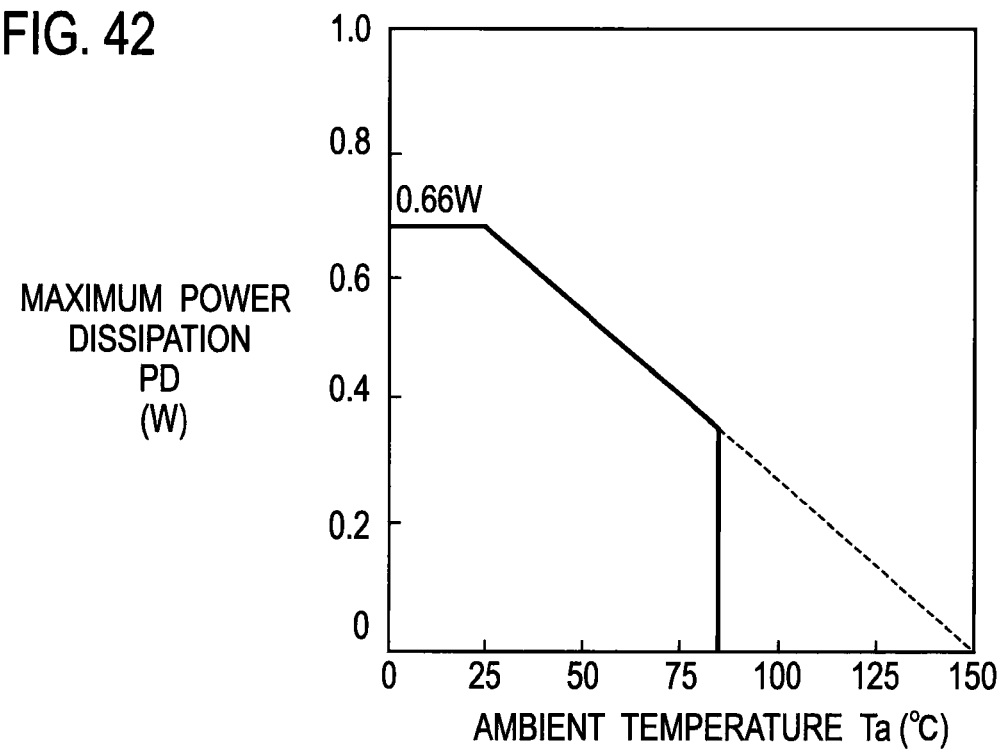
FIG. 42 shows characteristic data showing the relation between the power dissipation PD and the ambient temperature Ta of the switching power supply according to the second embodiment of the present invention.

The relation between the power dissipation PD and the ambient temperature Ta of the switching power supply according to the second embodiment is expressed as shown in FIG. 42.

Since the switching power supply according to the second embodiment is the high-efficiency, it is not necessary to take great generation of heat into consideration with almost all applications. However, it is necessary to take the power dissipation, the thermal design, etc. into consideration at the time of the use in the low input voltage, the high-output voltage, the heavy load, and the high temperature.

As the loss PD, only the conduction power loss PD ($I^2R$) by the DC resistance of the coil and the on resistance of n-channel MOSFET and p-channel MOSFET is examined. Although there are the gate charge loss PD (gate), the switching power loss PD (SW), etc. in the loss PD in addition to this, on the above-mentioned conditions, it is because the conduction power loss PD ($I^2R$) becomes the most dominant. In the equation (2), RON is expressed by a following formula:

$$RON = D \times Ronp + (1-D)Ronn \quad (7)$$

where D denotes the on-duty (=VOUT/Vcc), Ronp denotes the on resistance of p-channel MOSFET, and Ronn denotes the on resistance of n-channel MOSFET.

For example, at the time of Vcc=3.3 V, VOUT=1.2 V, Ronp=0.6 Ω, Ronn=0.5 Ω, and IOUT=0.3 A, it is set to RON=0.36×0.6+(1−0.36)×0.5=0.216+0.320=0.536 (Ω) from D=VOUT/Vcc=1.2/3.3=0.36, and P=$0.3^2$×0.536 nearly=48.24 (mW) is obtained.

The switching power supply according to the second embodiment is Ronp>Ronn, and the loss becomes large as the value of the on-duty D is large.

In the switching power supply according to the second embodiment, the thermal design having a margin enough is performed in consideration of the above power dissipation.

(Selection of Externally Connected Circuit Element Parts)

-Selection of Externally Connected Coil L-

Figure 43A:
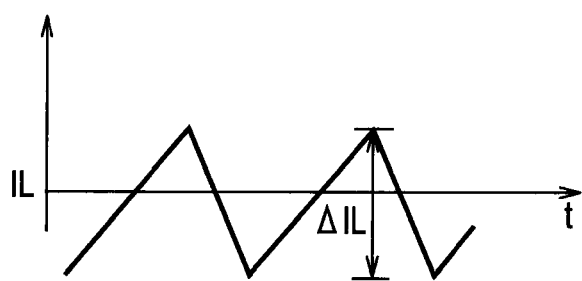
FIG. 43A is a figure for explaining selection of an externally connected coil of the switching power supply according to the second embodiment of the present invention, and is a schematic diagram of output ripple current.
Figure 43B:
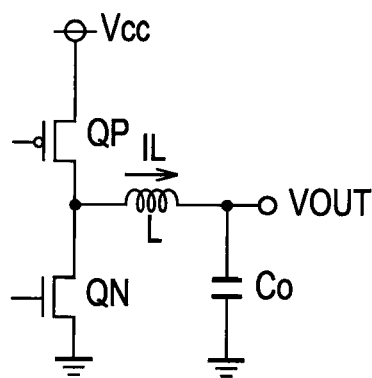
FIG. 43B is a figure for explaining selection of the externally connected coil of the switching power supply according to the second embodiment of the present invention, and is a circuit configuration chart.

Selection of the externally connected coil of the switching power supply according to the second embodiment will be explained using a schematic waveform of the output ripple current ΔIL shown in FIG. 43A, and a circuit configuration shown in FIG. 43B.

The value of the externally connected coil L influences the output ripple current ΔIL greatly.

The output ripple current ΔIL is expressed by a following formula:

$$\Delta IL = (Vcc - VOUT) \times VOUT/(L \times Vcc \times f) \text{ (A)} \quad (8)$$

The value of the output ripple current ΔIL decreases as the value of the switching frequency f is high and the value of the externally connected coil L is large, as shown in an equation (8).

It is suitable for the setting value of the output ripple current ΔIL that it is about 30% of the peak output current. That is, if the output ripple current ΔIL satisfies a following formula $$\Delta IL = 0.3 * IOUT\text{max. (A)}, \quad (9)$$

the value of the externally connected coil L is expressed by a following formula $$L = (Vcc - VOUT) \times VOUT/(\Delta IL \times Vcc \times f) \text{ (H)}. \quad (10)$$

For example, it is set to ΔIL=0.3×0.3=0.09 (A) at the time of Vcc=3.3 (V), VOUT=1.2 (V), f=2 (MHz), and IOUT max.=0.3 A.

Therefore, the value of L=(3.3−1.2)×1.2/(0.09× 3.3×2)=4.2 (μH) is obtained.

As the value of the externally connected coil L of the switching power supply according to the second embodiment, it is preferable to use the inductor having the value of about 1 to 4.7 μH, for example, for the miniaturization of application or the stability of operation. However, if the current exceeding the rated current value of the coil is passed through the externally connected coil L, the externally connected coil (L) occurs the magnetic saturation, and the efficiency is reduced.

Accordingly, the rated current value of the externally connected coil L is selected by securing sufficient margin, as that peak current may not exceed the rated current value of the coil.

In order to decrease the loss by externally connected coil L and to apply the value of the efficiency η satisfactory, it is preferable to select the externally connected coil L with a low resistance component (the direct-current (DC) resistance component DCR, alternating current (AC) resistance component ACR).

-Selection of Externally Connected Output Capacitor Co-

Figure 44:
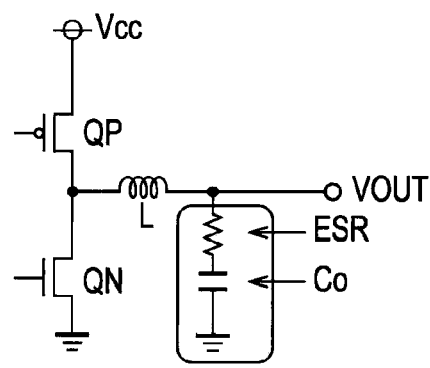
FIG. 44 is a circuit configuration chart for explaining selection of the externally connected output capacitor of the switching power supply according to the second embodiment of the present invention.

Selection of the externally connected output capacitor Co of the switching power supply according to the second embodiment will be explained using a circuit configuration shown in FIG. 44.

The value of the externally connected output capacitor Co is determined in consideration of the value of equivalent series resistance ESR needed to smooth the stability region of the output voltage VOUT and the output ripple voltage AVOUT.

The output ripple voltage AVOUT is determined as shown in a following formula (11):

$$\Delta VOUT = \Delta IL \times ESR \text{ (V)} \quad (11)$$

The rated voltage value of the externally connected output capacitor Co secures sufficient margin for the output voltage VOUT to select. If the value of the equivalent series resistance ESR is small, the output ripple voltage ΔVOUT can be applied small.

Since it is necessary to set up the rise time of the output in range of the soft start time Tss, the capacitance value of the externally connected output capacitor Co also takes the conditions of the formula (11) into consideration. That is:

$$Co <= Tss \times (Ilimit - IOUT)/VOUT \quad (12)$$

where Ilimit denotes the overcurrent detection value, has a value of about 0.6 A (Typ.), for example.

For example, at the time of VOUT=1.8 V, IOUT=0.3 A, and Tss=0.2 ms, the value of Co<=Tss×(Ilimit−IOUT)/ VOUT=0.2 ms×(0.6−0.3)/1.8 nearly=33.3 (μF) is obtained.

About the selection of the externally connected output capacitor Co of the switching power supply according to the second embodiment, since poor initiating may occur if the capacitance value of the externally connected output capacitor Co is not the optimal, it is preferable to use a ceramic condenser about 10 μF to about 22 μF, for example.

-Selection of Input Capacitor Cin-

Figure 45:
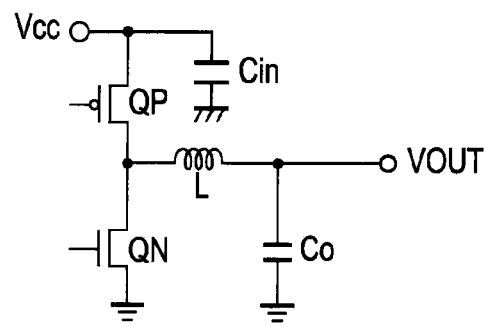
FIG. 45 is a circuit configuration chart explaining externally connected input capacitor selection of the switching power supply according to the second embodiment of the present invention.

Selection of the externally connected input capacitor Cin of the switching power supply according to the second embodiment will be explained using a circuit configuration shown in FIG. 45.

In the selection of the externally connected input capacitor Cin, in order to prevent great transient voltage, it is necessary to be the externally connected input capacitor Cin of low ESR, which can correspond to great ripple current enough.

The ripple current IRMS is given by a following formula (12). That is:

$$IRMS = IOUT \times \{VOUT(Vcc \times VOUT)\}^{1/2}/Vcc \text{ (A)} \quad (13)$$

IRMS (max.) acting as the worst conditions is given by IRMS=IOUT/2 at the time of Vcc=2×VOUT.

For example, the value of IRMS=0.3×{1.2 (3.3−1.2)}$^{1/2}$/ 3.3=0.14 (ARMS) is obtained at the time of Vcc=3.3 V, VOUT=1.2 V, and IOUTmax=0.3 A.

Moreover, in order to decrease the ESR loss and to receive the efficiency η of the externally connected input capacitor Cin, it is preferable to use about 10 μF ceramic condenser of the about 10 V breakdown voltage of low ESR for example.

-Externally Connected Circuit Element Parts-

Figure 46:
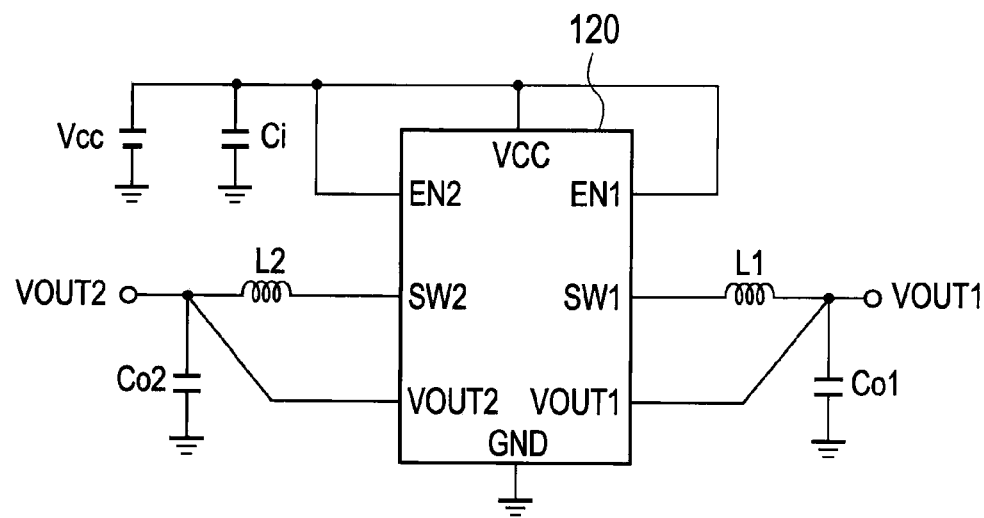
FIG. 46 is a schematic circuit configuration chart of externally connected circuit element parts, in the switching power supply according to the second embodiment of the present invention.

In the switching power supply according to the second embodiment, a schematic circuit configuration of the externally connected circuit element parts is expressed as shown in FIG. 46.

-Notes at the time of Board Layout-

Figures 47, 48:
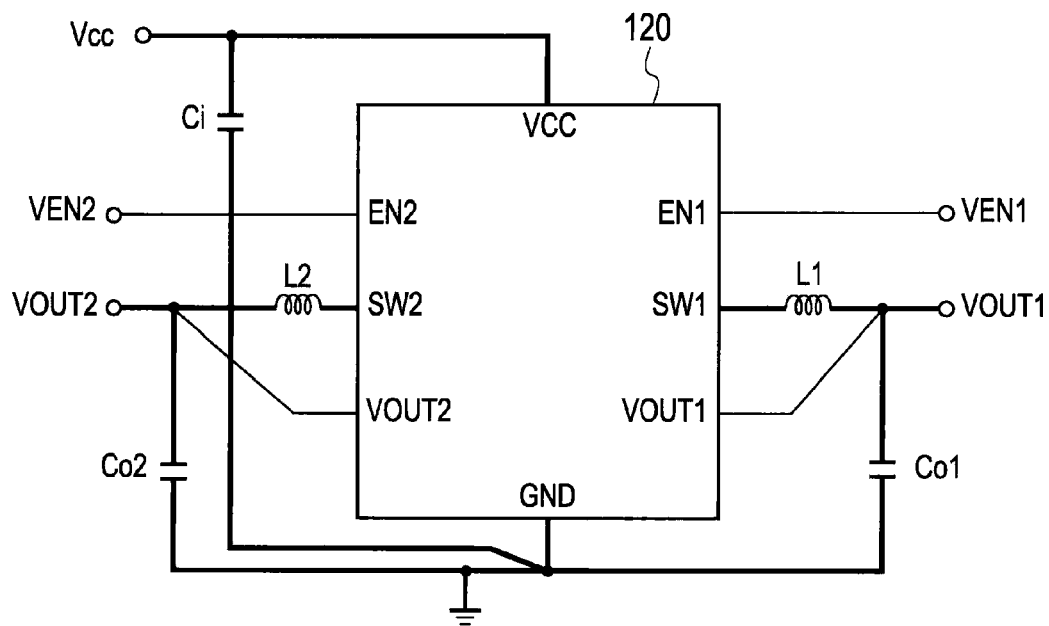
FIG. 47 is a schematic circuit configuration chart of the externally connected circuit element parts at the time of a board layout, in the switching power supply according to the second embodiment of the present invention.
FIG. 48 shows an example of the externally connected circuit element parts applicable to the switching power supply according to the second embodiment of the present invention.

In the switching power supply according to the second embodiment, a schematic circuit configuration of the externally connected circuit element parts at the time of a board layout is expressed as shown in FIG. 47.

The part of a thick line is arranged as short as possible, with a broad circuit pattern.

As for the ceramic condenser Ci of the input, it is preferable to arrange in the position near the Vcc-GND pin of the switching power supply 100 according to the second embodiment. As for the output capacitors Co1 and Co2, it is preferable to arrange in the position near the GND pin of the switching power supply 100 according to the second embodiment.

-Applicable Externally Connected Circuit Element Parts-

As the externally connected circuit element parts applicable to the switching power supply 100 according to the second embodiment, an example of a preferred parts list in the application shown in FIG. 47 is expressed as shown in FIG. 48.

That is, as the coils L1 and L2, about 2.2 μH coil is applied, for example.

Moreover, as the ceramic condenser Ci of the input, about 10 μF condenser is applied, for example.

Moreover, as both the output capacitors Co1 and a Co2, about 10 μF ceramic condenser is applied.

Moreover, when the influence of the switching noise etc. is great, it is effective to insert a Schottky diode between SW-GND.

In addition, when using by changing the externally connected circuit constant, it is effective to secure a margin enough and determine in consideration of the variation in the externally connected circuit element parts and the switching power supply 100, etc. not only including a static characteristic but including a transient characteristic.

(Input/Output Equivalent Circuit)

Figure 49:
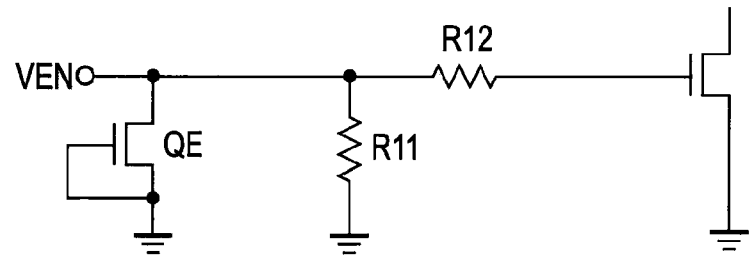
FIG. 49 is an input equivalent circuit configuration diagram seen from an enable terminal EN, in the switching power supply according to the second embodiment of the present invention.

In the switching power supply according to the second embodiment, an input equivalent circuit configuration seen from the enable terminal EN is expressed as shown in FIG. 49.

Figure 50:
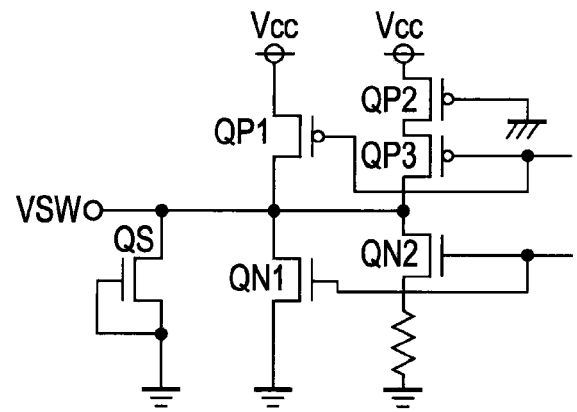
FIG. 50 is an output equivalent circuit configuration diagram seen from an SW terminal, in the switching power supply according to the second embodiment of the present invention.

Moreover, an output equivalent circuit configuration seen from the SW terminal is expressed as shown in FIG. 50.

Figure 51:
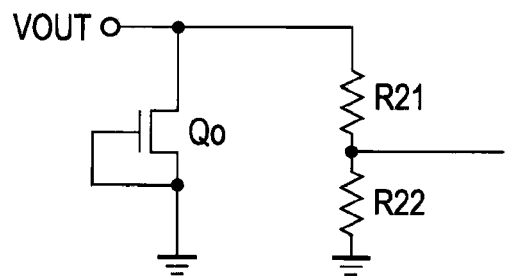
FIG. 51 is an output equivalent circuit configuration diagram seen from an output terminal, in the switching power supply according to the second embodiment of the present invention.

Moreover, an output equivalent circuit configuration seen from the output terminal is expressed as shown in FIG. 51.

According to this embodiment, the switching power supply and the portable device, which achieve a high-efficiency in a full load area, can be provided.

According to the switching power supply according to this embodiment, since the efficiency at the time of no-load required with a cellular phone etc. is substantially improvable, the extension of a stand by time period can be achieved.

Moreover, according to the switching power supply according to this embodiment, overall circuit current can be reduced, without worsening in particular a precipitous load response etc.

Other Embodiments

The present invention has been described by the first through second embodiments, as a disclosure including associated description and drawings to be construed as illustrative, not restrictive. With the disclosure, artisan might easily think up alternative embodiments, embodiment examples, or application techniques.

Such being the case, the present invention covers a variety of embodiments, whether described or not.

INDUSTRIAL APPLICABILITY

The switching power supply according to the present invention is applicable to the power supply of mobile products, such as a cellular phone, a smart phone, PDA, a portable media player, a digital camera, and wireless LAN.

REFERENCE SIGNS LIST 3, 3a, 3b: Level shifter;
4, 4a, 4b: Voltage detection comparator (error amplifier, Gm amplifier);
5a, 5b: Soft start circuit;
6, 6a, 6b: Current detection comparator (the second comparator);
7, 7a, 7b: Current detection comparator (the first comparator);
8, 8a, 8b: Flip-flop (FF);
9, 9a, 9b: Current detection/protection and driver circuit;
10, 10a, 10b: Regulator;
11a: Output short circuit detecting circuit (SCP1);
11b: Output short circuit detecting circuit (SCP2);
12: Reference voltage generator (VREF);
13: Oscillator (OSC);
14: Output short circuit/thermal shutdown detection signal generation unit (SCP/TSD);
15: Malfunction prevention circuit at the time of low input voltage (UVLO);
16: Load;
80: Functional block circuit;
90: Circuit current reduction block;
100: Switching power supply;
120: 2-channel switching power supply;
QP, QPa, QPb: p-channel MOSFET;
QN, QNa, QNb: n-channel MOSFET;
VOUT, VOUT1, VOUT2: Output voltage;
Vcc: Input voltage;
R1, R2, R3: Resistance; and
C3: Capacitor.

The invention claimed is:

1. A switching power supply comprising:
a switching element which is connected to a power supply voltage and performs ON and OFF operation;
a control circuit for performing ON and OFF control of the switching element;
a coil by which the amount of current value which flows through the switching element is controlled;
a capacitor which is connected to the coil and performs a rectifying operation with the coil;
an oscillator for outputting an oscillator signal for controlling the switching element into ON for every constant period to the control circuit;
a first comparator for comparing a current detection voltage which transforms a detection current which flows through the coil into a voltage, and the feedback voltage according to a difference of a voltage according to an output voltage outputted from a connection node between the capacitor and the coil with a reference voltage; and
a second comparator for comparing a threshold voltage set as a voltage value which is higher than the current detection voltage and is lower than the power supply voltage, with the feedback voltage.

2. The switching power supply according to claim 1, wherein
in the second comparator, when the value of the threshold voltage is larger than the value of the feedback voltage, the second comparator outputs an OFF signal to the first comparator and the oscillator, and invalidates the oscillator signal from the oscillator.

3. The switching power supply according to claim 1, wherein
in the second comparator, when the value of the feedback voltage is larger than the value of the threshold voltage, the second comparator outputs an ON signal to the first comparator and the oscillator, and the first comparator outputs a reset signal to the control circuit, and turns OFF the output current.

4. The switching power supply according to claim 1, wherein
in the first comparator, when the value of the current detection voltage is larger than the value of the feedback voltage, the first comparator outputs a reset signal of a low level.

5. The switching power supply according to claim 1, wherein
the current detection voltage supplied to the first comparator is overlapped on a slope compensation waveform.

6. The switching power supply according to claim 5, wherein
a cycle by the slope compensation waveform is the same synchronization with the oscillator signal from the oscillator.

7. The switching power supply according to claim 1 further comprising:
a voltage comparator into which the voltage according to the output voltage and the reference voltage are inputted, wherein
a voltage according to the difference of a voltage according to the output voltage outputted from the voltage comparator and the said reference voltage is supplied to the first comparator.

8. The switching power supply according to claim 7 further comprising:
a level shifter for performing level conversion of a voltage outputted from the voltage comparator.

9. The switching power supply according to claim 7 further comprising:
a soft start circuit connected to the voltage comparator and for giving an inclination to rising of the output voltage.

10. The switching power supply according to claim 1, wherein
the control circuit comprises:
a Flip-flop circuit where the oscillator signal from the oscillator is inputted into a set terminal, and the output from the first comparator is inputted into a reset terminal; and
a driver circuit for controlling ON and OFF of the switching element according to an output from the flip-flop circuit.

11. The switching power supply according to claim 1, wherein
the switching device comprises:
CMOSFET composed of p-channel MOSFET by which a drain is connected to the coil and a source is connected to power supply voltage and n-channel MOSFET by which a drain is connected to the coil and a source is connected to ground potential.

12. The switching-power supply according to claim 1, wherein
the current detection voltage supplied to the first comparator is overlapped on a slope compensation waveform.

13. A switching power supply comprising
a first switching power supply comprising: a first switching element connected to a power supply voltage and for performing ON and OFF operation; a first control circuit for performing ON and OFF control of the first switching element; a first coil by which an amount of current value which flows through the first switching element is controlled; a first capacitor connected to the first coil and for performing a rectifying operation with the first coil; an oscillator for outputting a first oscillator signal for controlling the first switching element into ON for every constant period to the first control circuit; a first of first comparator for comparing a first current detection voltage which transforms a detection current which flows through the first coil into a voltage and a first feedback voltage according to the difference of a voltage according to a first output voltage outputted from a connection node of the first capacitor and the first coil, with a reference voltage; and a second of first comparator for comparing a first threshold voltage set as a voltage value which is lower than the power supply voltage and is higher than the first current detection voltage, with the first feedback voltage; and
a second switching power supply comprising: a second switching element connected to the power supply voltage and for performing ON and OFF operation; a second control circuit for performing ON and OFF control of the second switching element; a second coil by which an amount of current value which flows through the second switching element is controlled; a second capacitor connected to the second coil and for performing a rectifying operation with the second coil; an oscillator for outputting a second oscillator signal for controlling the second switching element into ON for every constant period to the second control circuit; a first of second comparator for comparing a second current detection voltage which transforms a detection current which flows through the second coil into a voltage and a second feedback voltage according to the difference of a voltage according to a second output voltage outputted from a connection node of the second capacitor and the second coil, with the reference voltage; and a second of second comparator for comparing a second threshold voltage set as a voltage value which is lower than the power supply voltage and is higher than the second current detection voltage, with the second feedback voltage, wherein
the first switching power supply and the second switching power supply are provided with a two-channel configuration in parallel, and operate on a frequency in synchronization with the first oscillator signal and the second oscillator signal from the oscillator with which the 180 degrees phase shifts, respectively at the time of PWM operation.

14. A portable device comprising a switching power supply, the switching power supply comprising:
a switching element which is connected to a power supply voltage and performs ON and OFF operation;
a control circuit for performing ON and OFF control of the switching element;
a coil by which the amount of current value which flows through the switching element is controlled;
a capacitor which is connected to the coil and performs a rectifying operation with the coil;
an oscillator for outputting an oscillator signal for controlling the switching element into ON for every constant period to the control circuit;
a first comparator for comparing a current detection voltage which transforms a detection current which flows through the coil into a voltage, and the feedback voltage according to a difference of a voltage according to an output voltage outputted from a connection node between the capacitor and the coil with a reference voltage; and
a second comparator for comparing a threshold voltage set as a voltage value which is higher than the current detection voltage and is lower than the power supply voltage, with the feedback voltage.

15. The portable device according to claim 14, wherein
in the second comparator, when the value of the threshold voltage is larger than the value of the feedback voltage, the second comparator outputs an OFF signal to the first comparator and the oscillator, and invalidates the oscillator signal from the oscillator.

16. The portable device according to claim 14, wherein
in the second comparator, when the value of the feedback voltage is larger than the value of the threshold voltage, the second comparator outputs an ON signal to the first comparator and the oscillator, and the first comparator outputs a reset signal to the control circuit, and turns OFF the output current.

17. The portable device according to claim 14, wherein
in the first comparator, when the value of the current detection voltage is larger than the value of the feedback voltage, the first comparator outputs a reset signal of a low level.

18. The portable device according to claim 14, wherein
a cycle by the slope compensation waveform is the same synchronization with the oscillator signal from the oscillator.

19. The portable device according to claim 14, the switching power supply further comprising:
a voltage comparator into which the voltage according to the output voltage and the reference voltage are inputted, wherein
a voltage according to the difference of a voltage according to the output voltage outputted from the voltage comparator and the said reference voltage is supplied to the first comparator.

20. The portable device according to claim 19, the switching power supply further comprising:
a level shifter for performing level conversion of a voltage outputted from the voltage comparator.

21. The portable device according to claim 19, the switching power supply further comprising:
a soft start circuit connected to the voltage comparator and for giving an inclination to rising of the output voltage.

22. The portable device according to claim 14, wherein the control circuit comprises:
a Flip-flop circuit where the oscillator signal from the oscillator is inputted into a set terminal, and the output from the first comparator is inputted into a reset terminal; and
a driver circuit for controlling ON and OFF of the switching element according to an output from the flip-flop circuit.

23. The portable device according to claim 14, wherein the switching device comprises:
CMOSFET composed of p-channel MOSFET by which a drain is connected to the coil and a source is connected to power supply voltage and n-channel MOSFET by which a drain is connected to the coil and a source is connected to ground potential.

24. A portable device comprising a switching power supply, the switching power supply comprising
a first switching power supply comprising: a first switching element connected to a power supply voltage and for performing ON and OFF operation; a first control circuit for performing ON and OFF control of the first switching element; a first coil by which an amount of current value which flows through the first switching element is controlled; a first capacitor connected to the first coil and for performing a rectifying operation with the first coil; an oscillator for outputting a first oscillator signal for controlling the first switching element into ON for every constant period to the first control circuit; a first of first comparator for comparing a first current detection voltage which transforms a detection current which flows through the first coil into a voltage and a first feedback voltage according to the difference of a voltage according to a first output voltage outputted from a connection node of the first capacitor and the first coil, with a reference voltage; and a second of first comparator for comparing a first threshold voltage set as a voltage value which is lower than the power supply voltage and is higher than the first current detection voltage, with the first feedback voltage; and
a second switching power supply comprising: a second switching element connected to the power supply voltage and for performing ON and OFF operation; a second control circuit for performing ON and OFF control of the second switching element; a second coil by which an amount of current value which flows through the second switching element is controlled; a second capacitor connected to the second coil and for performing a rectifying operation with the second coil; an oscillator for outputting a second oscillator signal for controlling the second switching element into ON for every constant period to the second control circuit; a first of second comparator for comparing a second current detection voltage which transforms a detection current which flows through the second coil into a voltage and a second feedback voltage according to the difference of a voltage according to a second output voltage outputted from a connection node of the second capacitor and the second coil, with the reference voltage; and a second of second comparator for comparing a second threshold voltage set as a voltage value which is lower than the power supply voltage and is higher than the second current detection voltage, with the second feedback voltage, wherein
the first switching power supply and the second switching power supply are provided with a two-channel configuration in parallel, and operate on a frequency in synchronization with the first oscillator signal and the second oscillator signal from the oscillator with which the 180 degrees phase shifts, respectively at the time of PWM operation.

* * * * *